(12) United States Patent
Shibuya

(10) Patent No.: US 6,935,597 B2
(45) Date of Patent: Aug. 30, 2005

(54) VEHICLE-MOUNTED ELECTRONIC APPARATUS

(75) Inventor: Yasushi Shibuya, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 332 days.

(21) Appl. No.: 09/968,701

(22) Filed: Oct. 1, 2001

(65) Prior Publication Data

US 2002/0101117 A1 Aug. 1, 2002

(30) Foreign Application Priority Data

Oct. 3, 2000 (JP) ........................................ 2000-303480

(51) Int. Cl.[7] .............................................. G12B 9/00
(52) U.S. Cl. ..................................... 248/27.1; 248/551
(58) Field of Search .............................. 248/27.1, 551, 248/685, 27.3; 312/7.1, 7.2, 9.41, 223.1; 369/75.1; 361/683, 686, 679; 455/345, 346, 347, 348, 90.3

(56) References Cited

U.S. PATENT DOCUMENTS

| | | | | |
|---|---|---|---|---|
| 5,010,437 A | * | 4/1991 | Utsugi et al. ................ | 360/137 |
| 5,177,730 A | * | 1/1993 | Utsugi ........................ | 369/75.1 |
| 5,184,489 A | * | 2/1993 | Squires et al. ................. | 70/58 |
| 5,362,144 A | * | 11/1994 | Shioya et al. ............ | 312/319.6 |
| 5,726,868 A | * | 3/1998 | Koyama et al. ............ | 361/832 |
| 5,848,042 A | * | 12/1998 | Takahashi et al. ......... | 369/75.1 |
| 5,982,637 A | | 11/1999 | Noguchi | |
| 6,147,596 A | * | 11/2000 | Tsuchiya et al. ......... | 340/425.5 |
| 6,659,405 B1 | * | 12/2003 | Takagi et al. ............... | 248/27.1 |
| 6,690,574 B2 | * | 2/2004 | Kasahara et al. ........... | 361/683 |
| 6,747,364 B1 | | 6/2004 | Shibuya et al. ............... | 307/9.1 |
| 2002/0122370 A1 | * | 9/2002 | Sasaki et al. ............... | 369/75.1 |
| 2002/0132604 A1 | * | 9/2002 | Sasaki et al. ............... | 455/345 |
| 2002/0135231 A1 | * | 9/2002 | Miura ........................ | 307/10.1 |
| 2002/0135279 A1 | * | 9/2002 | Tobishima ................. | 312/9.41 |
| 2002/0153810 A1 | * | 10/2002 | Tobishima et al. ........... | 312/7.2 |

(Continued)

FOREIGN PATENT DOCUMENTS

| | | |
|---|---|---|
| EP | 1 026 040 A | 8/2000 |
| JP | 09-309389 | 12/1997 |

Primary Examiner—Ramon O Ramirez
(74) Attorney, Agent, or Firm—Brinks Hofer Gilson & Lione

(57) ABSTRACT

A vehicle-mounted electronic apparatus includes a case having an opening on the front surface thereof, a face that moves from an ordinary orientation which is vertical or oblique in front of the case to an accommodated orientation in which the face is accommodated within the case, a manipulation member disposed on the manipulation surface of the face so as to face forward when the face is in the ordinary orientation, and an orientation variable means for circularly moving the face from the ordinary orientation to the accommodated orientation and for drawing the face into the case through the opening. The manipulation member is supported by the face so as to be free to advance and retract, so that the amount of projection thereof from the manipulation surface changes. When the face is circularly moved from the ordinary orientation to the horizontal orientation a retracting mechanism retracts the manipulation member by the relative moving force between the orientation variable means and the face so that the amount of projection of the manipulation member from the manipulation surface is reduced. With the above arrangement, when the face is in its ordinary orientation outside the case, the amount of projection of the manipulation member is set to a large amount L1. When the face circularly moves from the vertical orientation to the horizontal orientation, the retracting mechanism is operated whereby the amount of projection of the manipulation member is reduced to a smaller amount L2. Therefore, when the face having the horizontal orientation is accommodated within the case, the manipulation member does not come into contact with the edge of the opening, and the like.

24 Claims, 12 Drawing Sheets

U.S. PATENT DOCUMENTS

| | | | |
|---|---|---|---|
| 2002/0176235 A1 * | 11/2002 | Kasahara et al. | 361/752 |
| 2003/0027545 A1 * | 2/2003 | Tobishima | 455/346 |
| 2003/0083039 A1 * | 5/2003 | Shimizu et al. | 455/347 |
| 2003/0085325 A1 * | 5/2003 | Sugimoto et al. | 248/27.1 |
| 2003/0174463 A1 * | 9/2003 | Chen | 361/683 |
| 2003/0193871 A1 * | 10/2003 | Tobishima et al. | 369/75.1 |
| 2003/0201671 A1 * | 10/2003 | Tobishima et al. | 307/10.1 |
| 2005/0029409 A1 * | 2/2005 | Tagle | 248/27.1 |

* cited by examiner

VEHICLE-MOUNTED ELECTRONIC APPARATUS

BACKGROUND OF THE INVENTION

1. Field of the Invention

The present invention relates to a vehicle-mounted electronic apparatus in which a face formed on the front surface of a case can be accommodated in the case in a horizontal orientation.

2. Description of the Related Art

Vehicle-mounted electronic apparatuses used for audio or car navigation are arranged such that a case of a 1DIN size or the like is embedded in a dashboard, an instrument panel, or the like in a passenger compartment, and a face disposed on the front portion of the case appears on a surface which is substantially flush with the dashboard or the instrument panel. Electronic circuits and various types of recording medium drive units, which are accommodated in the case, are controlled by manipulation members disposed on the surface of the face.

In this type of vehicle-mounted electronic apparatus, the face usually is secured to the front surface of a case or circularly movable to an inclined orientation in front of the case.

In vehicle-mounted electronic apparatuses, however, when a face is secured to the front surface of a case or disposed in an inclined orientation, the face is located on the front surface of the vehicle-mounted electronic apparatus at all times. Thus, the apparatus can be easily recognized from the outside appearance thereof, which causes a problem that it may be stolen from the passenger compartment. Further, in an electronic apparatus in which a face circularly moves in front of a case, the inclined orientation of the face permits a recording medium insertion port and the like located on the front surface of the case to be exposed. However, it is difficult to effectively utilize the front surface of the case located on the back side of the face in a wide range.

Thus, when an opening is formed in a case so that a face can be accommodated in the case from the opening in a horizontal orientation, a vehicle-mounted electronic apparatus cannot be recognized from the outside appearance thereof, and the theft thereof can be prevented. Further, the front surface of the case widely appears in a state in which the face is accommodated in the case, which makes it possible to constitute a wide variety of vehicle-mounted electronic apparatuses by disposing, for example, many manipulation members on the front surface of the case.

However, in this structure in which the face is accommodated in the case, there is a possibility that manipulation members such as a rotary knob, a push button, and the like come into contact with the edge of the opening of the case when the face is accommodated in the case. To cope with this problem, a gap or a cut-out through which the manipulation members pass must be formed between the manipulation surface of the face and the edge of the opening. However, when the size of the gap is increased or the cut-out is made, the opening cannot be sufficiently closed at a time the face is accommodated in the case. Further, the gap or the cut-out appears on the front surface of the case in a state in which the face is accommodated, whereby the outside appearance of the case is spoiled.

Furthermore, when the size of projection of the manipulation members projecting from the manipulation surface of the face was reduced, it became difficult to manipulate the manipulation members with fingers when the face is located on the front portion of the case.

SUMMARY OF THE INVENTION

An object of the present invention for solving the above problems is to provide a vehicle-mounted electronic apparatus arranged such that when a face is located on the front portion a case, manipulation members can sufficiently project from the manipulation surface of the face, whereas when the face is accommodated in the case, the manipulation members can retract within the face.

A vehicle-mounted electronic apparatus of the present invention including a case having an opening on the front surface thereof, a face that moves from an ordinary orientation which is vertical or oblique in front of the case to an accommodated orientation in which the face is accommodated in the case by way of a horizontal orientation which is horizontal in front of said case, a manipulation member disposed on the manipulation surface of the face so as to face forward when the face is in the ordinary orientation, and an orientation variable means for circularly moving the face from the ordinary orientation to the accommodated orientation and for drawing the face into the case from the opening is characterized in that the manipulation member is supported by the face so as to be free to advance and retract so that the amount of projection thereof from the manipulation surface changes and that a retracting mechanism is disposed to retract, when the face is circularly moved from the ordinary orientation to the accommodated orientation, the manipulation member by the relative moving force between a member constituting the orientation variable means and the face so that the amount of projection of the manipulation member from the manipulation surface is reduced.

For example, a manipulation type part that is manipulated by the manipulation member is secured to the face, and when the manipulation member is advanced and retracted by the retracting mechanism, the relative position between the manipulation type part and the manipulation member is varied.

When the manipulation type part is arranged as a part to be manipulated by being rotated, the advancing/retracting mechanism increases a guide portion for guiding the manipulation member in an advancing/retracting direction while maintaining the coupling of the manipulation member with the manipulation type part, a rotary type cam member for advancing and retracting the manipulation member along the guide portion, and a transmission member for circularly moving the cam member by the relative moving force between a member constituting the orientation variable means and the face when the face circularly moves to the accommodated orientation.

Otherwise, a manipulation type part that is manipulated by the manipulation member is accommodated in the face, and the manipulation type part and the manipulation member are advanced and retracted together by the retracting mechanism.

Also in this case, when the manipulation type part is arranged as a part to be manipulated by being rotated, the advancing/retracting mechanism increases a guide portion for guiding the manipulation member in an advancing/ retracting direction while maintaining the coupling of the manipulation member with the manipulation type part, a rotary type cam member for advancing and retracting the manipulation member along the guide portion, and a transmission member for circularly moving the cam member by the relative moving force between a member constituting the orientation variable means and the face when the face circularly moves to the accommodated orientation.

Further, in the present invention, when the face having the accommodated orientation enters the case at the opening, the manipulation member retracts to a position where it does not come into contact with the edge of the opening. For example, when the face is in the accommodated orientation, the opening is closed by the end surface of the face, and, at this time, the manipulation member retracts to a height where it does not project in the width direction of the end surface.

For example, the orientation variable means includes a reciprocating member for executing an advancing/retracting motion while circularly movably supporting the face and a switching arm for circularly movably supporting the face at a position different from the reciprocating member, and when the reciprocating member moves forward of the fulcrum of the switching arm on the base end side thereof, the face changes its orientation from the ordinary orientation to the accommodated orientation, and when the reciprocating member and the switching arm retract into the case, the face having the accommodated orientation is accommodated in the case; and the retracting mechanism retracts the manipulation member by the relative moving force between the reciprocating member or the switching arm and the face.

In the present invention, the face is circularly moved from the ordinary orientation to the accommodated orientation by the orientation variable means and, at the same time, the manipulation member is retracted making use of the circularly moving force of the face. As a result, when the face is in the ordinary orientation, the manipulation member can be projected in an amount which causes the manipulation member to be manipulated easily, whereas when the face is in the accommodated orientation, the manipulation member retracts so as not to come into contact with the edge of the opening at a time the face retracts into the case.

Further, since the manipulation member is retracted by the relative moving force between the face and the orientation variable means, no drive source is necessary to retract the manipulation member into the face.

DESCRIPTION OF THE PREFERRED EMBODIMENTS

Figure 1:
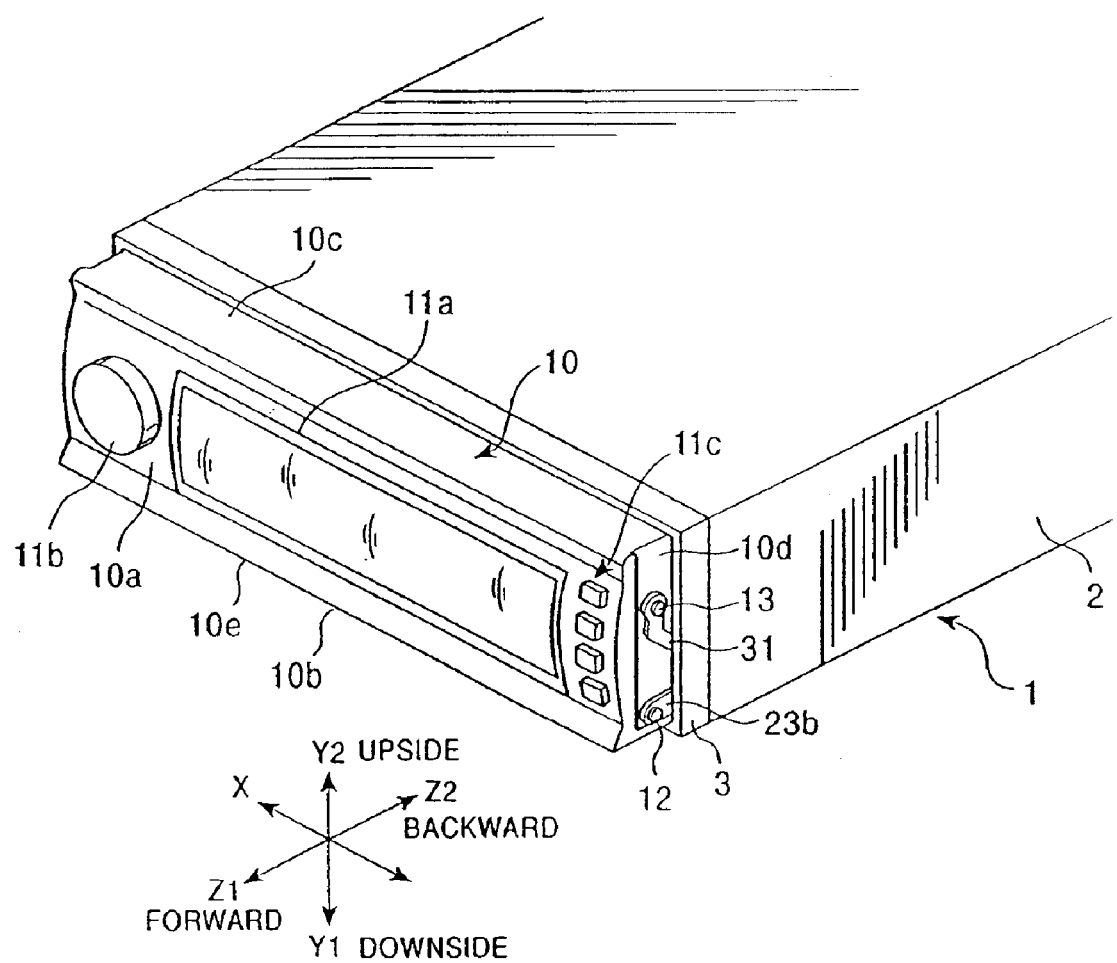
FIG. 1 is a perspective view of a vehicle-mounted electronic apparatus showing a state in which a face is in an ordinary orientation.
Figure 2:
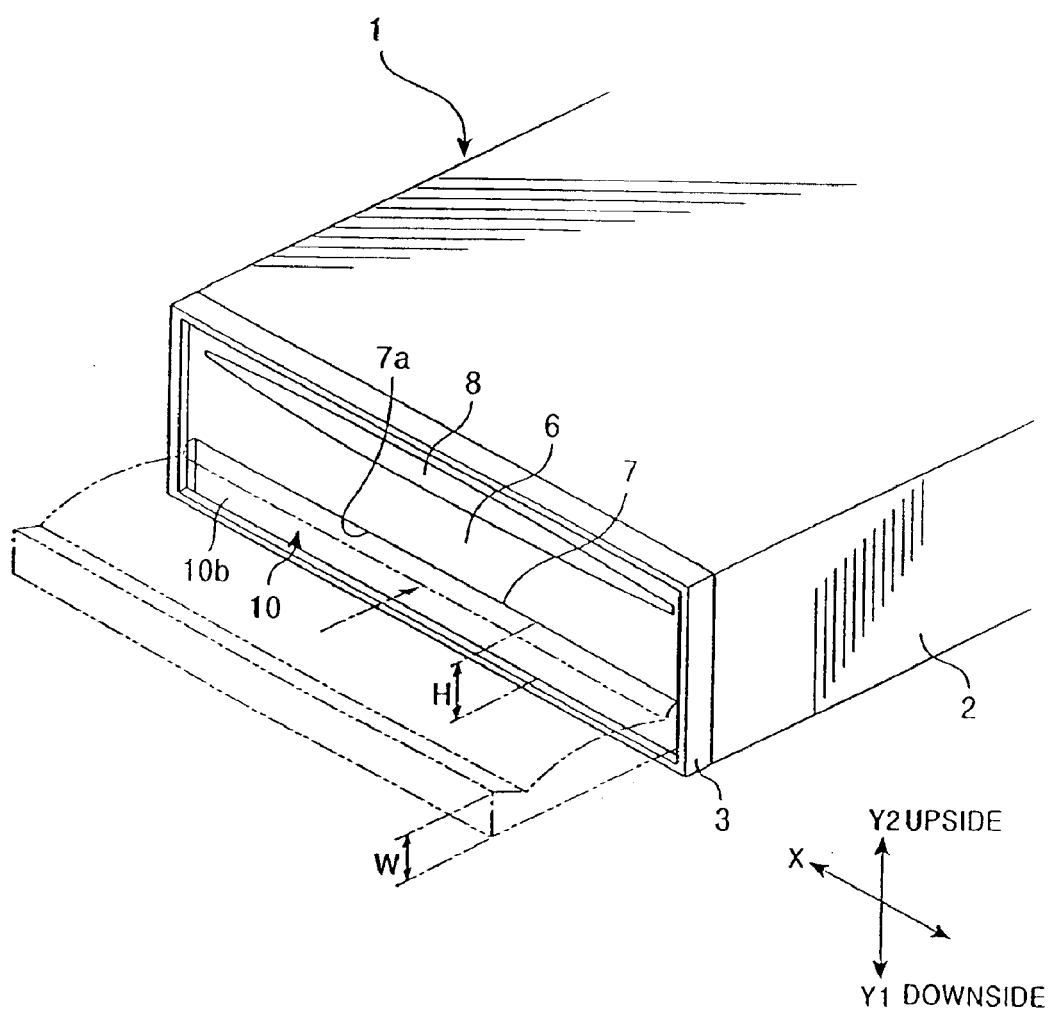
FIG. 2 is a perspective view of the vehicle-mounted electronic apparatus showing a state in which the face is in an accommodated orientation.
Figure 3:
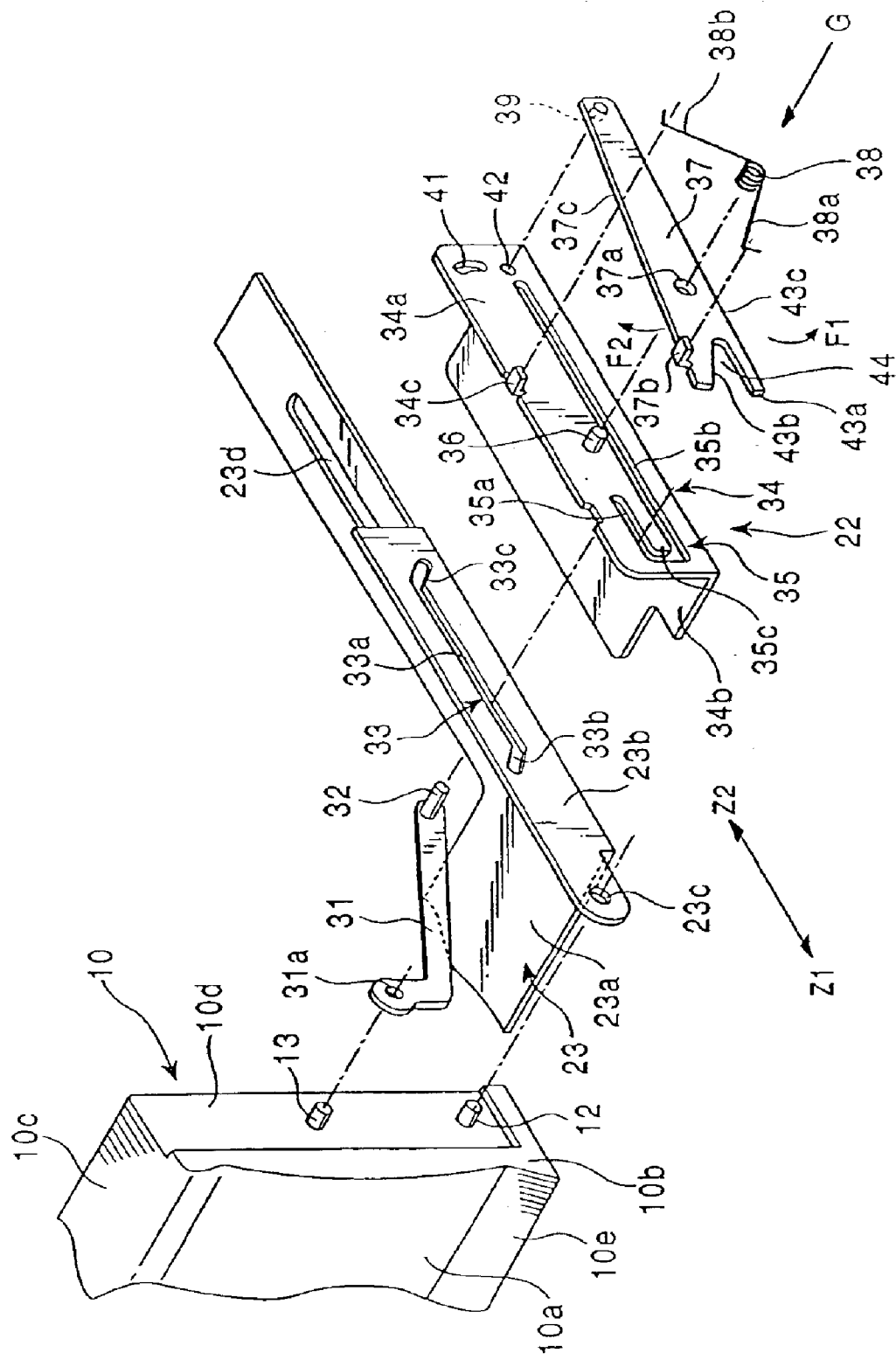
FIG. 3 is an exploded perspective view showing the structure of an orientation variable means disposed on the right side of the face.
Figure 4:
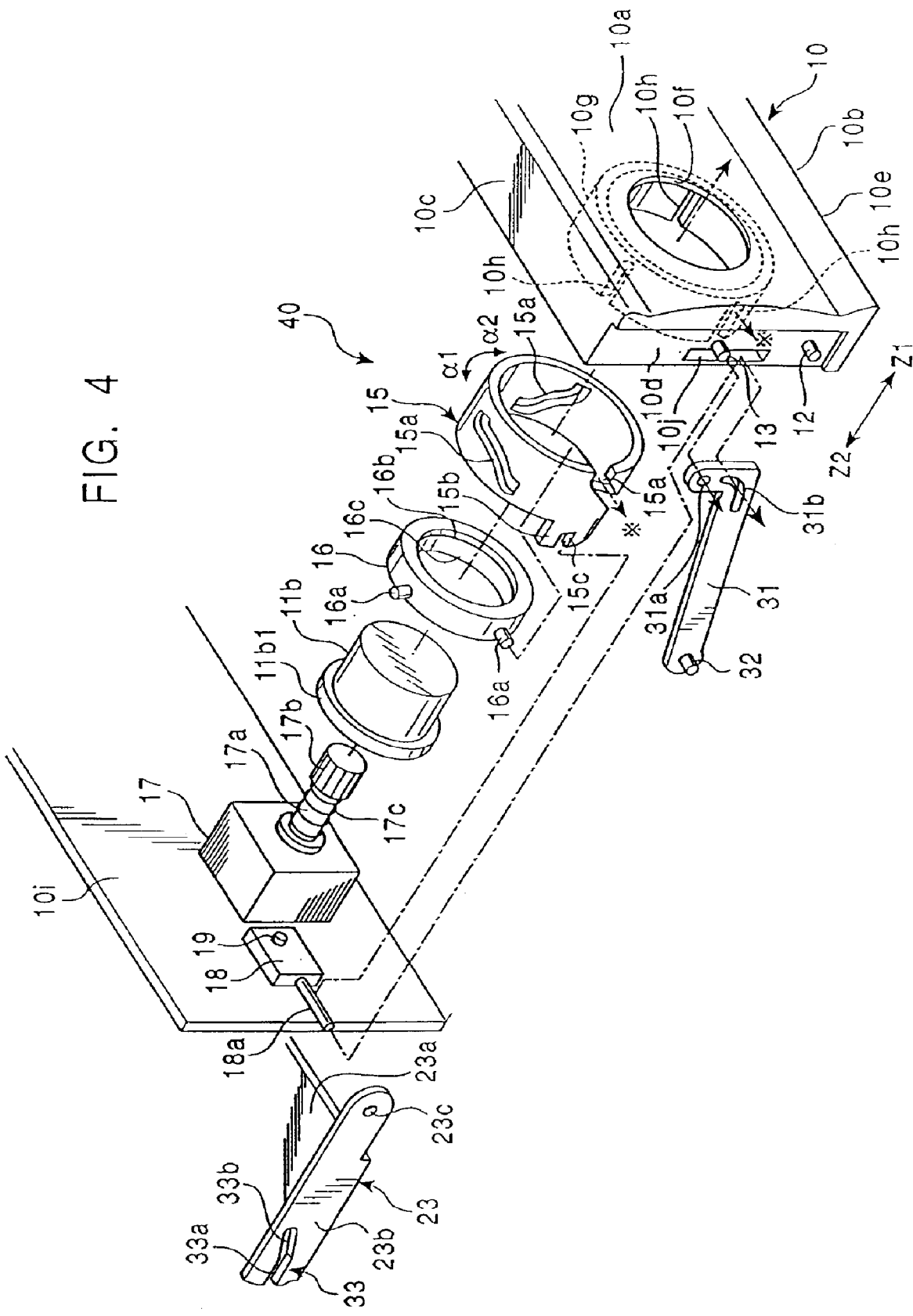
FIG. 4 is an exploded perspective view showing the structure of an orientation variable means disposed on the left side of the face and the structure of a retracting mechanism.
Figure 5:
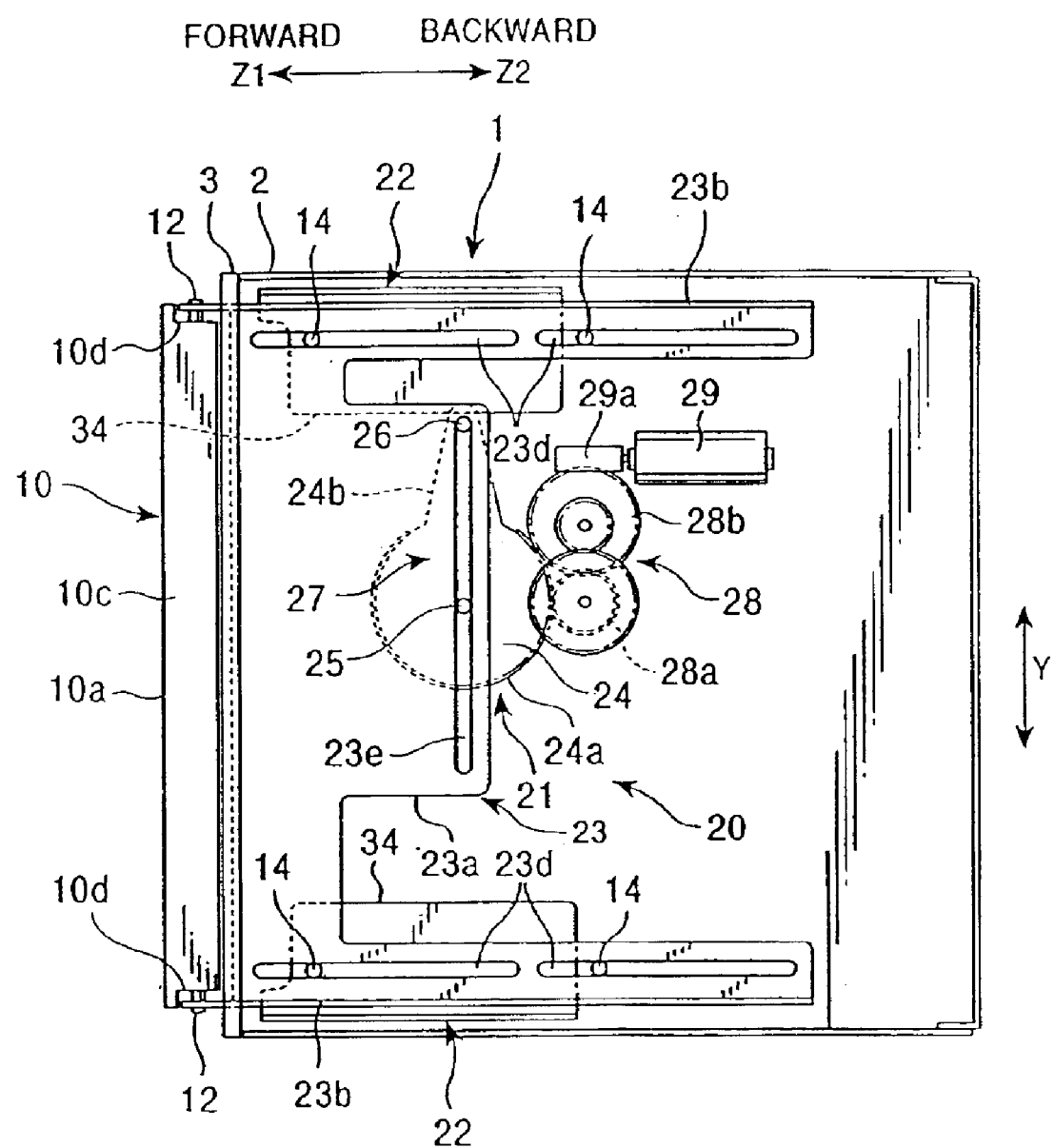
FIG. 5 is a plan view showing an operation of a reciprocating drive means and shows the ordinary state of the face.
Figure 6:
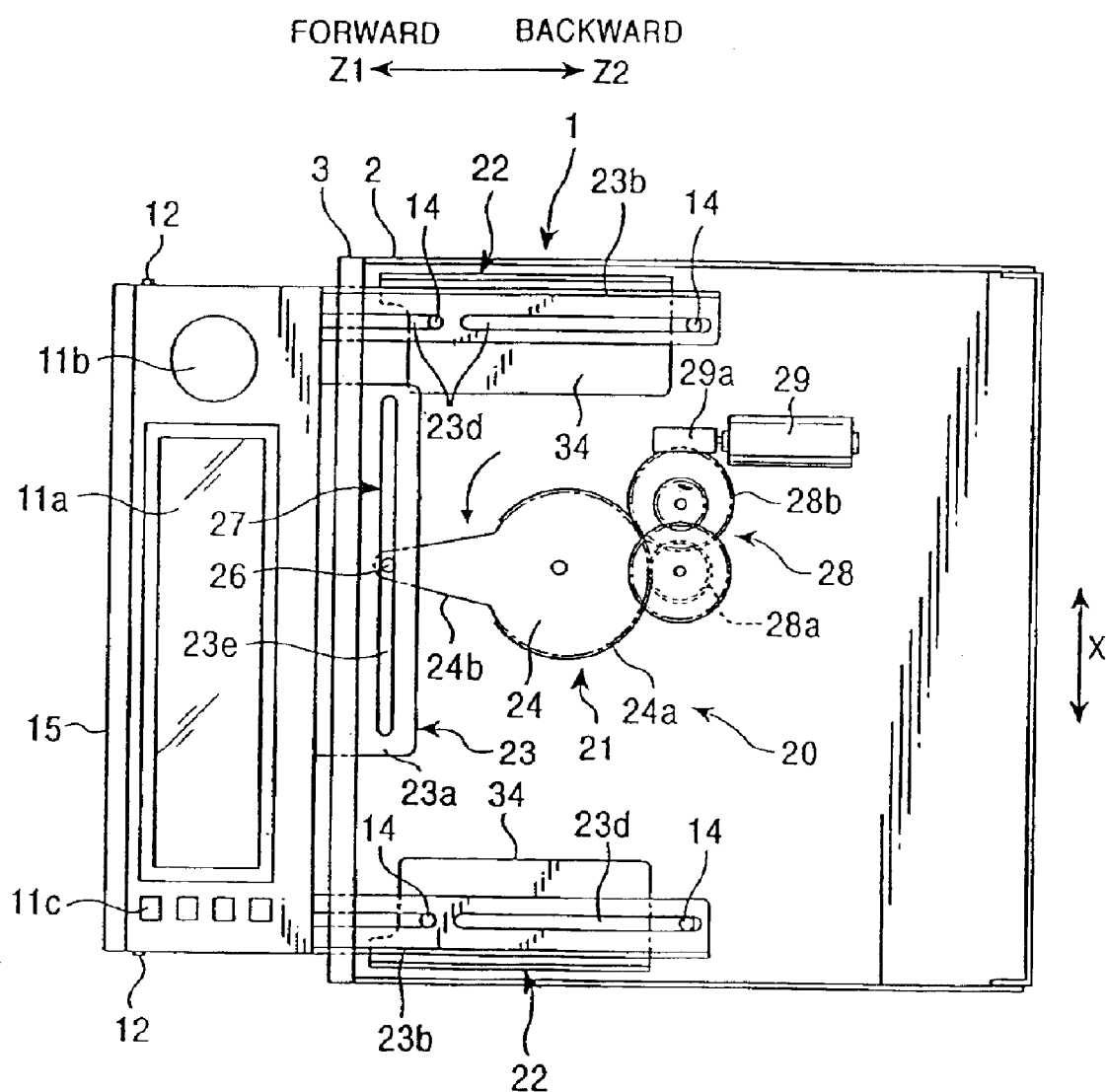
FIG. 6 is a plan view showing an operation of the reciprocating drive means and the projecting state of the face.
Figure 7:
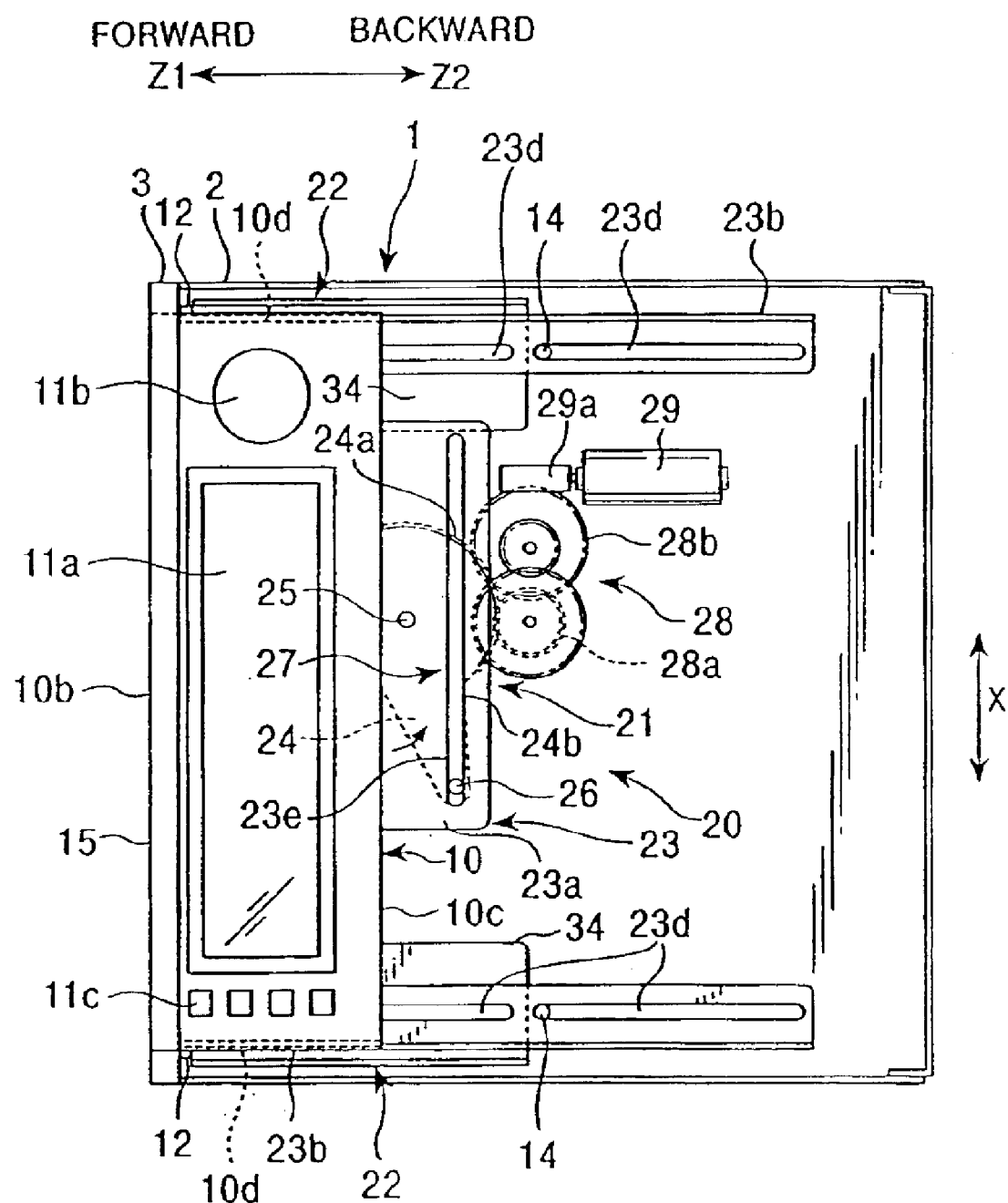
FIG. 7 is a plan view showing an operation of the reciprocating drive means and the accommodated state of the face.
Figure 8A:
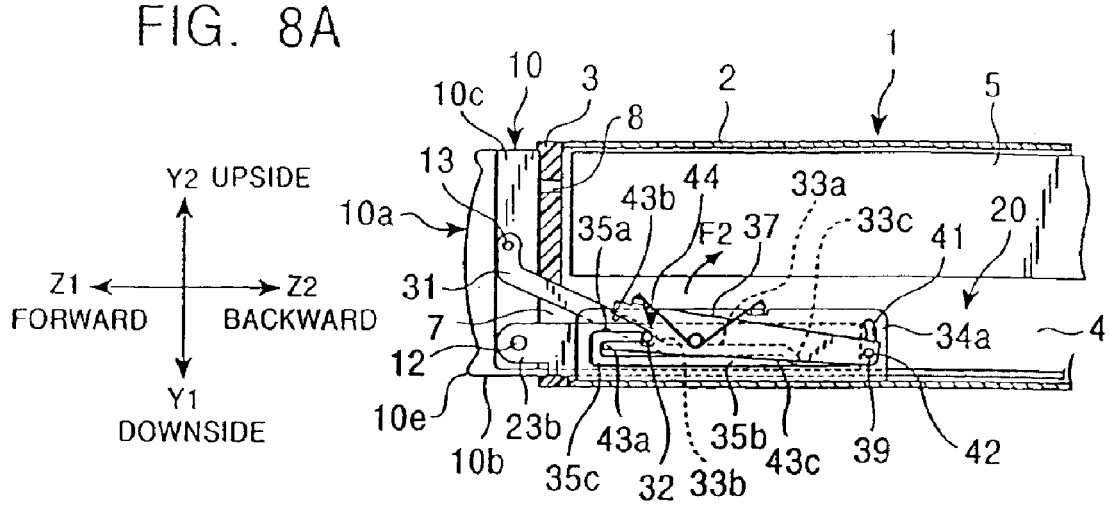
FIGS. 8A, 8B, and 8C are side elevational views showing operations of the face from an ordinary orientation to an inclined orientation.
Figure 8B:
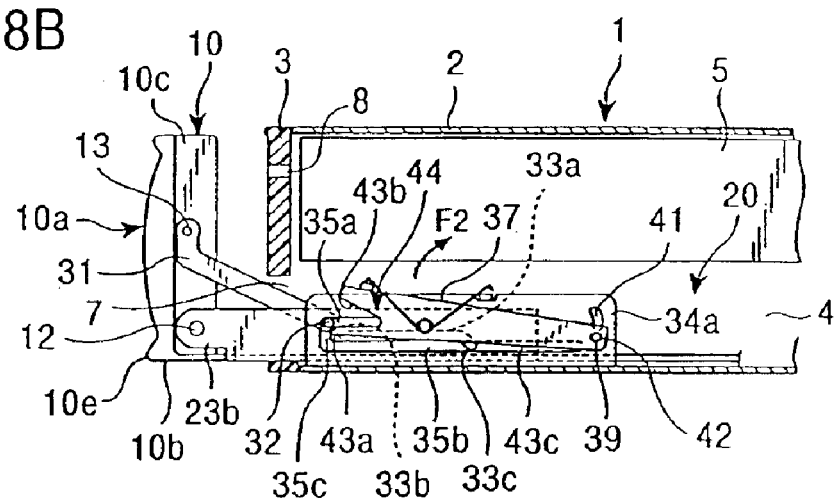
Figure 8C:
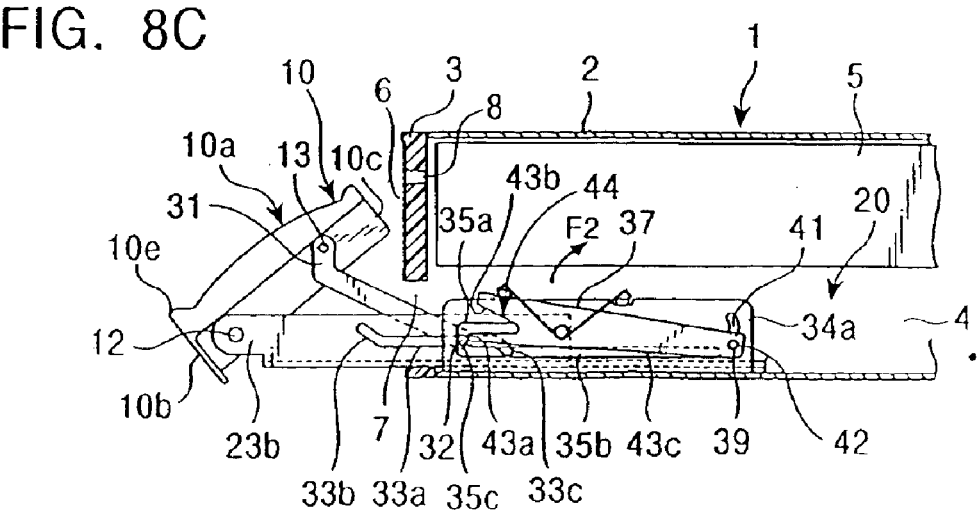
Figure 9A:
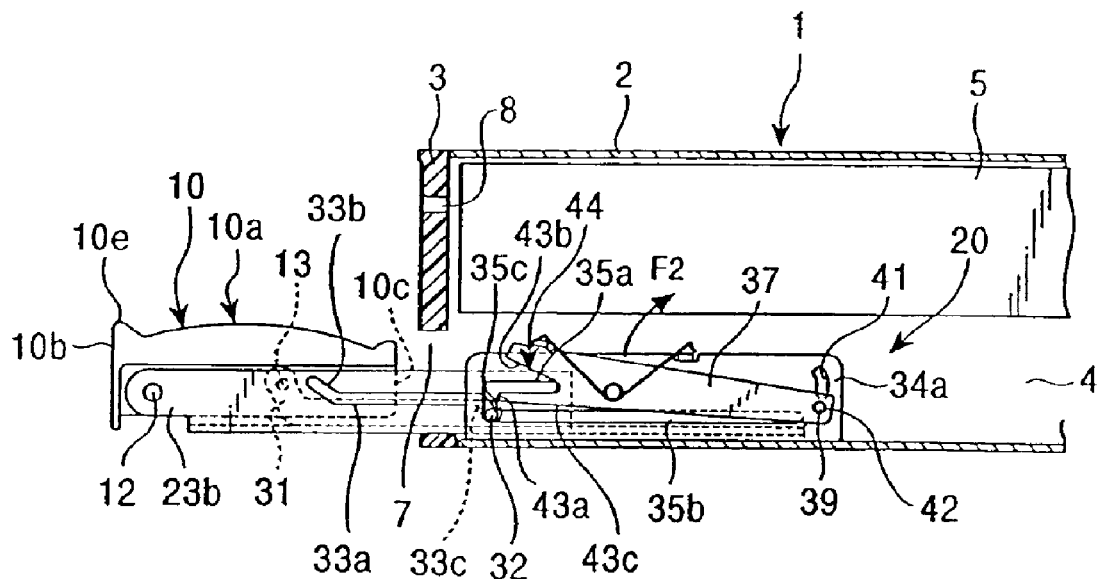
FIGS. 9A and 9B are side elevational views showing operations of the face from an ordinary orientation to an accommodated orientation.
Figure 9B:
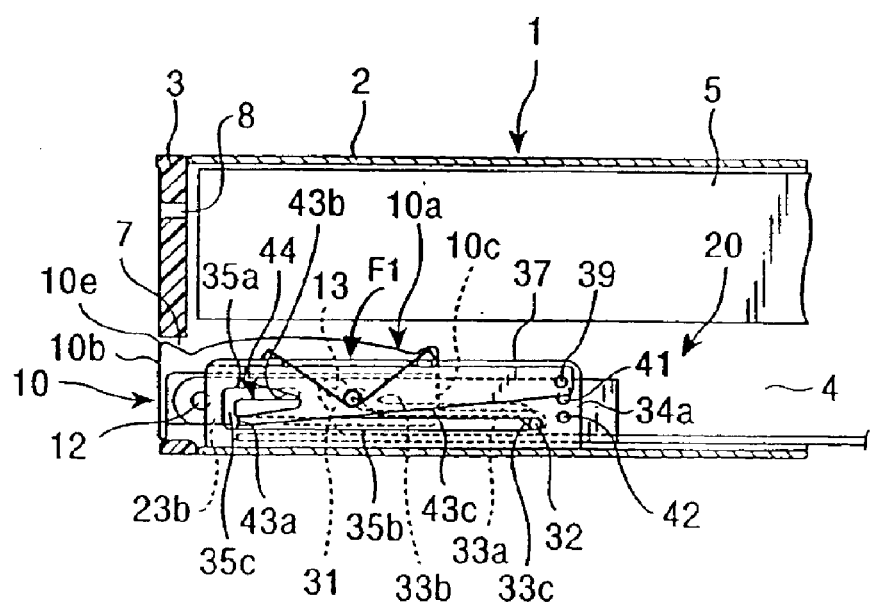
Figure 10A:
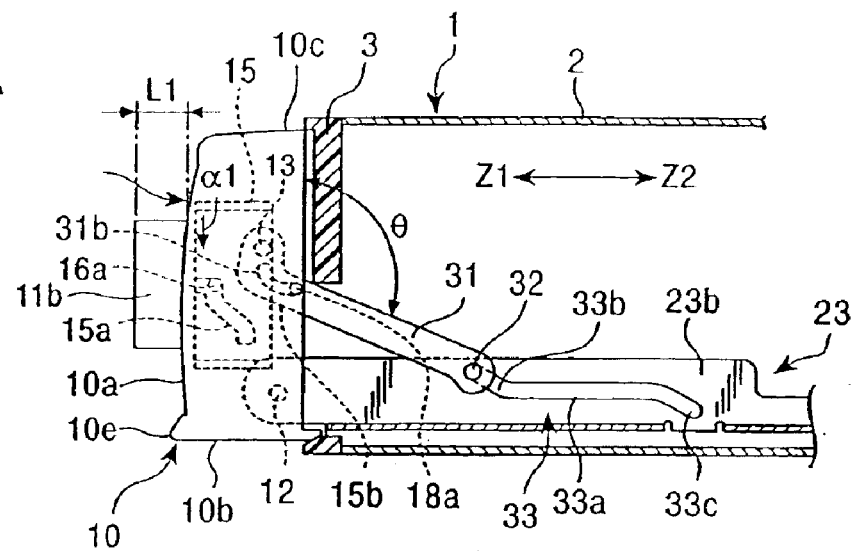
FIGS. 10A, 10B, and 10C are side elevational views showing operations of the retracting mechanism when the face circularly moves to a accommodated orientation.
Figure 10B:
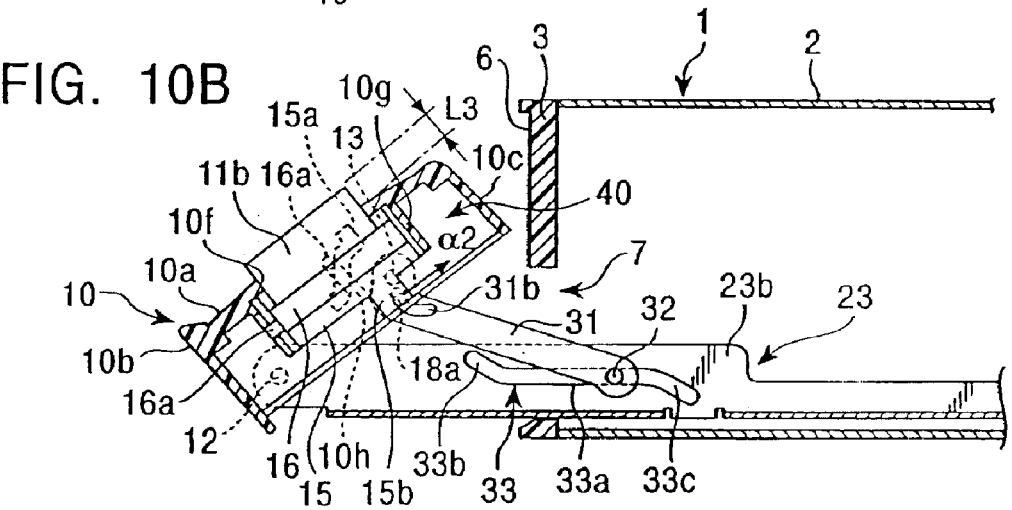
Figure 10C:
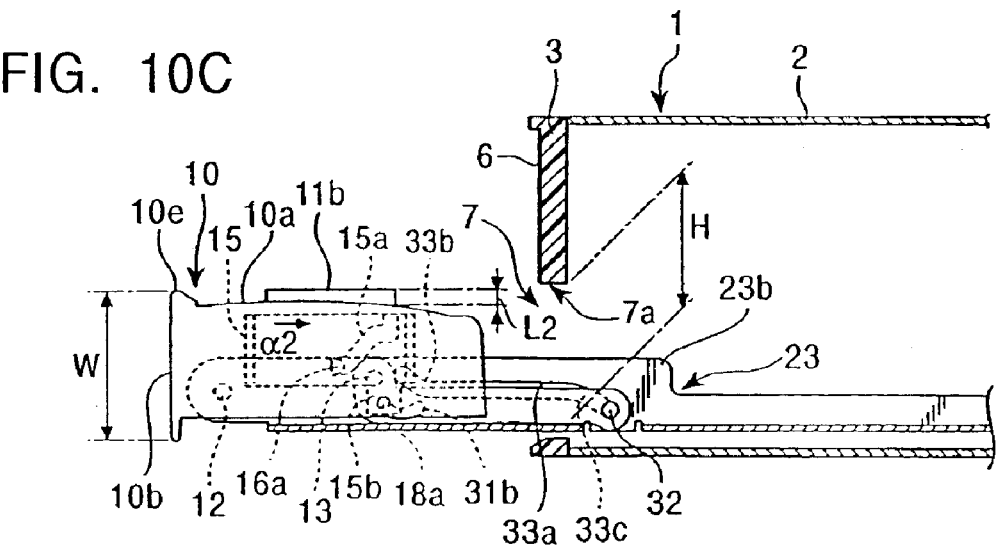

FIG. 1 is a perspective view showing a vehicle-mounted electronic apparatus when a face is in an ordinary orientation, FIG. 2 is a perspective view showing the vehicle-mounted electronic apparatus when the face has moved from an ordinary orientation to an accommodated orientation, FIG. 3 is an exploded perspective view showing the structure of an orientation variable means, FIG. 4 is an exploded perspective view showing the relationship between the orientation variable means and a retracting means, FIG. 5 to FIG. 7 are plan views showing operations of a reciprocating drive means of the orientation variable means when the face moves from the ordinary orientation to the accommodated orientation, FIG. 8A to FIG. 9B are partial side elevational views showing a series of operations when the face moves from the ordinary orientation to the accommodated orientation, and FIGS. 10A, 10B, and 10C are side elevational views showing operations of the retracting mechanism.

A case 1 of the vehicle-mounted electronic apparatus is composed of a cabinet 2 and a front panel 3 secured to the front surface of the cabinet 2. The cabinet 2 may be of a 1DIN size (2DIN size is also possible) and is embedded, for example, in the dashboard or the instrument panel in the passenger compartment of a vehicle. At this time, the front panel 3 is approximately flush with the front surface of the dashboard or the instrument panel.

In this embodiment, a Y1-direction indicates a downside, and a Y2-direction indicates an upside. Further, an X-direction indicates a right to left direction, a Z1-direction indicates a forward direction, and a Z2-direction indicates a backward direction.

As shown in FIG. 8A, the downside (Y1-side) in the interior of the cabinet 2 is arranged as an accommodating region 4 for the face, and the accommodating region 4 is arranged as a cavity. Further, the upside (Y2-side) thereof is an installing region 5 for internal devices. Various types of electronic circuits for audio, image display, radio, and the like are installed in the installing region 5. Further, drive units for recording mediums such as a CD, a DVD, a MD, and the like are installed in the installing region 5. In the illustrated embodiment, the drive units for the recording mediums are disposed on the front side of the installing region 5 (Z1-side).

As shown in FIG. 2, the front surface of the front panel 3 constituting a part of the case 1 is arranged as a face disengaging surface 6. An opening 7 is formed through the face disengaging surface 6 at a position toward the downside (Y1-side) thereof. The opening 7 has an opening width of H in a height direction and opens in a slender and approximately rectangular shape in a right and left direction (X-direction). Further, the upper edge 7a of the opening 7 extends straight in a right and left direction. As shown in FIG. 8A, the opening 7 communicates with the accommodating region 4 in the cabinet 2.

An inlet/outlet port 8, through which a recording medium can be inserted and discharged, opens through the face disengaging surface 6 at a position toward the upside (Y2-side) thereof. The inlet/outlet port 8 opens at the position from which the recording medium (disc) can be inserted to and discharged from the drive unit thereof installed in the installing region 5.

The face disengaging surface 6 is mainly arranged as a flat surface in the entire region thereof except the opening 7 and the inlet/outlet port 8, and the front surface thereof is black, dark green, or the like. This color is the same as that of a face 10 to be described later. In this embodiment, no display member is provided with the face disengaging surface 6, and the face disengaging surface 6 does not substantially function as a display surface or a manipulation surface.

As shown in FIG. 1, the face 10 can be installed in front of the front panel 3. The face 10 has a size which occupies an area substantially the same as that of the front surface (face disengaging surface 6) of the front panel 3. The surface (front surface) of the face 10 is arranged as a control surface 10a, substantially the entire surface of which is arranged as a manipulation surface or a display surface. A display member 11a and manipulation members 11b and 11c are disposed on the control surface 10a. The display member 11a is used to display an equalizer or a receiving frequency of a radio or arranged as a liquid crystal TV that displays an image received by the TV or an image of a map of a navigation system. That is, the display member 11a having a large screen can be disposed on the control surface 10a because no inlet/outlet port for a recording medium is disposed on the control surface 10a.

The face 10 has an upper end surface 10c and a lower end surface 10b, and the front edge portion 10e of the lower end surface 10b extends forward with respect to the control surface 10a. As shown in FIG. 2, the width W of the lower end surface 10b is substantially the same as the width H of the opening 7. In this vehicle-mounted electronic apparatus, the face 10 is accommodated in the case 1 in a horizontal orientation and hidden therein as shown in FIG. 2. When the face 10 is in the accommodated orientation, the lower end surface 10b is located at the opening 7 and substantially flush with the face disengaging surface 6 so that the opening 7 is closed by the lower end surface 10b. At this time, the face 10 can be camouflaged as if it was removed from the face disengaging surface 6, whereby the theft of the vehicle-mounted electronic apparatus can be prevented.

When the face 10 returns from the accommodated state to the ordinary orientation in which it is installed in front of the front panel 3 as shown in FIG. 1, the display member 11a is permitted to make display and the electronic apparatus can be manipulated through the manipulation members 11b and 11c. The manipulation members 11b and 11c control and manipulate the recording medium drive unit and a TV tuner accommodated in the cabinet 2 and manipulate a recording medium drive unit, a disc changer, or a car navigator disposed outside of the cabinet. The manipulation member 11b is composed of a rotary manipulation knob and the manipulation members 11c are composed of push buttons. The manipulation member 11b is free to project and retract from the control surface (manipulation surface) 10a.

As shown in FIG. 4, a retracting mechanism 40 is disposed in the interior of the face 10 to project and retract the manipulation member 11b. As shown in FIG. 4, a round hole 10f, through which the rotary manipulation type manipulation member 11b is inserted, opens on the left side of the control surface 10a of the face 10. Further, a cylindrical guide portion 10g having an inside diameter slightly larger than the round hole 10f is formed on the back surface of the face 10 integrally with the round hole 10f. Guide grooves 10h that extend in the forward and backward direction (Z-direction) of the apparatus are formed in the cylindrical guide portion 10g at three positions at an equal angle.

A rotary type cam member 15 is inserted into the guide portion 10g. The cam member 15 is composed of synthetic resin, inserted into the guide portion 10g without leaving almost any gap therebetween and free to rotate in an α1–α2 direction in the guide portion 10g. Further, cam grooves 15a are formed through the cam member 15 spirally toward a Z-direction at three positions. The cam grooves 15a are disposed in a circumferential direction at the same angle as that at which the guide grooves 10h of the guide portion 10g are disposed.

An advancing/retracting member 16 is inserted into the cam member 15. The outer peripheral surface of the advancing/retracting member 16 is formed as a cylindrical surface and slidably inserted into the cam member 15 without leaving almost any gap therebetween. The advancing/retracting member 16 is composed of synthetic resin and has guide projections 16a formed on the outer peripheral surface thereof integrally therewith at three positions. The guide projections 16a are disposed at the three positions at the same angle as that at which the cam grooves 15a and the guide grooves 10h are disposed. The guide projections 16a are inserted into the cam grooves 15a and further the extreme ends thereof are inserted into the guide grooves 10h in an assembled state in which the cam member 15 is inserted into the guide portion 10g and the advancing/retracting member 16 is inserted into the cam member 15.

A round hole 16b is formed in the front portion of the advancing/retracting member 16, and a stepped portion 16c is formed on the inside of the round hole 16b. A flange 11b1 is formed in the base end of the manipulation member 11b composed of the rotary knob. When the manipulation member 11b is inserted into the round hole 16b of the advancing/retracting member 16 from the rear end thereof, the flange 11b1 is abutted against the stepped portion 16c.

A rotary manipulation type part 17 is secured to the back surface sheet 10i of the face 10 (or to a base sheet located in the interior of the face 10). The rotary manipulation type part 17 is composed of a rotary encoder (for example, a rotary type variable resistor, or a contact type or optical type rotary switch) or like. The rotary manipulation type part 17 has a manipulation shaft 17a disposed thereon. The rotation of the manipulation shaft 17a permits the rotary manipulation type part 17 to be rotated and manipulated. The manipulation shaft 17a is attached to the rotary manipulation type part 17 so as to be free to advance thereto and retract therefrom. Further, the manipulation shaft 17a is urged in a projecting direction by a compressed coil spring 17c. A head portion 17b is formed at the extreme end of the manipulation shaft 17a integrally therewith. The peripheral surface of the head portion 17b is knurled and engaged with the back surface side of the manipulation member 11b so that the manipulation shaft 17a is secured to the manipulation member 11b integrally with each other.

The manipulation member 11b projects forward from the round hole 10f of the control surface 10a in a state in which the cam member 15 is assembled to the guide portion 10g, the advancing/retracting member 16 is inserted into the cam member 15, and the manipulation member 11b is inserted into the advancing/retracting member 16. Further, since the manipulation shaft 17a and the manipulation member 11b are urged in the Z1-direction by the compressed coil spring 17c, the flange portion 11b1 of the manipulation member 11b is pressed against the stepped portion 16c of the manipulation member 11b at all times by the urging force.

A transmission member 18 is circularly movably supported on the back surface sheet 10i through a shaft 19. A transmission shaft 18a is disposed on the transmission member 18 integrally therewith and projects to the outside from a slot 10j formed through a side surface 10d of the face 10. A locking piece 15b is formed on the cam member 15 at the base end thereof integrally therewith, and a locking groove 15c is formed on the locking piece 15b. The locking groove 15c is engaged with the transmission shaft 18a. In this embodiment, the retracting mechanism 40 is composed of the guide portion 10g, the cam member 15, the advancing/retracting member 16 and the transmission member 18.

When the face 10, which is in the ordinary vertical orientation, is accommodated in front of the face disengaging surface 6 of the front panel 3 as shown in FIG. 8A, after the face 10 moves forward a predetermined distance without inclining, the lower end surface 10b of the face 10 further moves forward, and the upper end surface 10c circularly moves downward during the period of time of movement of the lower end surface 10b. Then, the face 10 is placed in a horizontal state (FIG. 9B) with the control surface 10a thereof substantially perpendicular to the face disengaging surface 6, and the face 10 is accommodated in the accommodating region 4 in the cabinet 2 while maintaining the horizontal orientation. Further, a process for converting the accommodated orientation of the face 10a to the ordinary orientation is opposite to the above process.

In the operation of the retracting mechanism 40 shown in FIG. 4, when the face 10 is in the ordinary vertical orientation, the manipulation member 11b projects from the control surface 10a a size L1 as shown in FIG. 10A. The manipulation member 11b retracts inwardly relative to the face 10 while the face 10 circularly moves from the ordinary orientation to the horizontal orientation, whereby the projecting distance of the manipulation member 11b from the control surface 10a becomes L2 as shown in FIG. 10C.

The structure and the operation of an orientation variable means 20 for moving the face 10 between the ordinary orientation and the accommodated orientation and further operating the retracting mechanism shown in FIG. 4 will be described below.

FIG. 3 shows an exploded perspective view of a mechanism, which supports the right side of the face 10, of the orientation variable means 20, and FIG. 4 shows a part of a mechanism for supporting the left side of the face 10. The orientation variable means 20 is mainly composed of a reciprocating drive means (reciprocating drive mechanism) 21, a switching arm 31, and a diverging means (diverging mechanism) 22 for diverging the face to the ordinary orientation and to the accommodated orientation.

As shown in FIGS. 3 and 4, support pins 12, 12 are secured to both sides of the face 10 in the right and left direction on the lower end surface 10b side thereof. In the reciprocating drive means 21, a reciprocating member 23, which is free to reciprocate forward and backward (in the Z1–Z2 direction), is disposed on the bottom side of the case 1. The reciprocating member 23 functions as a support member for circularly movably supporting the lower end of the face 10. The reciprocating member 23 is composed of a bottom sheet 23a and bent pieces 23b, 23b which are formed by bending both the right and left sides of the bottom sheet 23a and raising them, the bottom sheet 23a and the bent pieces 23b, 23b being formed integrally with each other from a single metal sheet by bending it.

As shown in FIGS. 3 and 4, support holes 23c, 23c are formed through the extreme ends of the bent pieces 23b, 23b, and the support pins 12, 12, which are disposed on both the side surfaces 10d, 10d of the face 10 at the lower end surface 10b side thereof, are circularly movably supported by the support holes 23c, 23c.

As shown in FIGS. 3 and 5, slots 23d, which are long in the forward and backward direction (Z1–Z2 direction), are formed through the bottom sheet 23a of the reciprocating member 23 at four positions. Each slot 23d is fitted on a guide pin 14 secured on the bottom sheet of the cabinet 2. As a result, the reciprocating member 23 can linearly reciprocate in the forward and backward direction.

As shown in FIG. 5, a rotary body 24 is circularly movably supported on the bottom sheet of the cabinet 2 by a center shaft 25 secured to the bottom sheet. The rotor 24 includes teeth 24a formed therearound and constitutes a partial gear. The teeth 24a have a predetermined arc-shaped module about the center shaft 25.

The teeth 24a are meshed with the pinion gear 28a of the output stage of a speed reduction gear train 28, and the gear 28b of the input stage of the speed reduction gear train 28 is meshed with a worm gear 29a secured to the output shaft of a motor 29. That is, a motor drive unit for reciprocating and circularly moving the rotary body 24 is composed of the speed reduction gear train 28 and the motor 29.

A circularly moving arm 24b is formed at the portion, where the teeth 24a are not formed, of the rotary body 24 integrally with the rotor 24, and a slide pin 26 is secured to the extreme end of the circularly moving arm 24b. A slot 23e, which extends linearly in the right and left direction, is formed through the bottom sheet 23a of the reciprocating member 23, and the slide pin 26 is slidably inserted into the slot 23e. A motion conversion means 27 for converting the rotary motion of the rotary body 24 into the reciprocating motion of the reciprocating member 23 is composed of the circularly moving arm 24b, the slide pin 26, and the slot 23e.

As shown in FIG. 5, when the rotor 24 circularly moves farthest clockwise, the reciprocating member 23 is drawn backward (in the Z2-direction). At this time, the face 10 is in the ordinary orientation for covering the front surface of the face disengaging surface 6 (FIG. 8A). FIG. 6 shows a state in which the rotor 24 circularly moves counterclockwise by about 90° from the state shown in FIG. 5 (approximately to a midpoint of the range of circular movement of the rotor 24). In this position, the reciprocating member 23 projects the farthest forward (in the Z1-direction). At this time, the face 10 is in the horizontal orientation as shown in FIG. 9A. FIG. 7 shows a state in which the rotor 24 moves further circularly to a final point in a counterclockwise direction. At this time, the face 10 is completely drawn into the case 1 (FIG. 9B).

Further, when the rotor 24 circularly moves clockwise from the state of FIG. 7 and reaches the state of FIG. 5, the face 10 in the accommodated orientation projects forward of the case 1, assumes a rising orientation, and moves to the ordinary orientation shown in FIG. 8A.

As shown in FIGS. 3 and 4, support pins 13 are secured to both the sides 10d, 10d of the face 10 at positions nearer to the upper end surface 10c than the support pins 12. FIGS. 3 and 4 show the orientation switching arms 31, 31. Holes 31a, 31a are formed through one end of each switching arm 31, 31, and the support pins 13 on both sides of the face 10 are circularly movably coupled in the holes 31a, 31a.

Further, as shown in FIG. 4, a curved slot 31b is formed through the switching arm 31 mounted on the left side of the face 10. The curved slot 31b is formed in a curved shape having a radius different than the center of the hole 31a depending upon its position. As shown in FIG. 4, the transmission shaft 18a of the transmission member 18 projects through the slot 10j of the face 10 and is further inserted into the curved slot 31b.

In addition, control pins 32, 32 are secured to the base ends of the respective switching arms 31. Guide portions 33, 33 each composed of a slot are formed in both of the bent pieces 23b, 23b of the reciprocating member 23. Each of the guide portions 33 is composed of a linear guide portion 33a extending horizontally in the forward and backward (Z1–Z2) direction, an upwardly inclined guide portion 33b extending obliquely upward on the front side of the linear guide portion 33a (Z1-direction), and a downwardly inclined guide portion 33c extending obliquely downward on the backside of the linear guide portion 33a (Z2-direction).

A switching arm 31 and a control pin 32 are disposed on both the right and left sides of the face 10, and the respective control pins 32, 32 are slidably inserted into the guide portions 33, 33. Note that the bent pieces 23b, 23b and the switching arms 31, 31, which are disposed on both sides, are free to advance and retract in the Z-direction through the sides of the opening 7 formed in the front panel 3.

While the detailed structure of the diverging units 22 is omitted in FIGS. 5 to 7, they are disposed on both sides in the right and left direction (X-direction), respectively in correspondence with the pair of orientation switching arms 31. In the following description, however, only the diverging unit 22 disposed on one side shown in FIG. 3 will be described. The structure of the diverging unit 22 disposed on the left side shown in FIG. 4 is symmetrical with that of the diverging unit shown in FIG. 3 with respect to the X-direction.

A diverging member 34 is disposed in the diverging unit 22. The diverging member 34 is formed by bending a metal sheet to an L-shape and composed of a control sheet portion 34a extending vertically in a longitudinal direction and a secured sheet portion 34b extending horizontally. As shown in FIG. 5, the secured sheet portion 34b is secured on the bottom sheet of the cabinet 2.

A diverging path 35 composed of a slot is formed through the control sheet portion 34a, and the control pin 32, which is inserted into the guide portion 33 of the bent piece 23b, is slidably inserted into the diverging path 35. The diverging path 35 has an ordinary orientation path 35a and an accommodated orientation path 35b formed therethrough. The ordinary orientation path 35a extends a short distance in the forward and backward direction (Z-direction), and the accommodated orientation path 35b, which is relatively longer than the ordinary orientation path 35a, extends parallel to and below the ordinary orientation path 35a and backward similarly to it. Further, the front end of the ordinary orientation path 35a is coupled with the front end of the accommodated orientation path 35b through a vertically extending switching path 35c.

A selection member 37 is disposed to the outside of the control sheet portion 34a of the diverging unit 34. A hole 37a formed through the selection member 37 is circularly movably supported by a support shaft 36 secured to the control sheet portion 34a. Further, the wound portion of a torsion spring 38 is fitted on the extreme end of the support shaft 36 inserted into the hole 37a of the selection member 37. The wound portion of the torsion spring 38 is prevented from being removed from the support shaft 36 by a removal prevention member (not shown) disposed on the extreme end of the support shaft 36.

One of the urging arms of the torsion spring 38, that is, an urging arm 38a is hooked to a spring hook piece 37b formed in to the selection member 37, and the other urging arm 38b thereof is hooked to a spring hook piece 34c bent at the upper end of the control sheet portion 34a. The selection member 37 is urged by the urging arm 38a of the torsion spring 38 in a counterclockwise direction (F1-direction) about the support shaft 36 acting as a fulcrum. Note that the circularly movable limit of the selection member 37 in the counterclockwise direction is determined by the upper side 37c of the selection member 37 that is abutted against the spring hook piece 34c.

Further, the wound portion of the torsion spring 38 has a function as a compressed spring. The wound portion, which is compressed and interposed between the selection member 37 and the removal preventing member at the extreme end of the support shaft 36, urges the selection member 37 in a G-direction with respect to the control sheet portion 34a at all times.

A small projection 39, which projects in the direction of the control sheet portion 34a, is disposed on the rear end of the selection member 37. The small projection 39 is formed by being raised from the selection member 37 by embossing or the like.

In contrast, an arc guide portion 41 and a lock portion 42 are formed through the control sheet portion 34a. The arc guide portion 41 is formed in a slot shape along an arc locus having its center at the support shaft 36, and the lock portion 42 is arranged as a round hole located below the arc guide portion 41 and formed on a line extending from the arc locus. When the small projection 39 is inserted into the arc guide portion 41, the selection member 37 can circularly move in the range of length of the arc guide portion 41. Further, when the small projection 39 moves over from the arc guide portion 41 and is engaged with the lock portion 42, it is pressed against the lock portion 42 by the urging force in the G-direction of the wound portion of the torsion spring 38 and kept unmovable in the lock portion 42, whereby the selection member 37 is in a lightly locked state.

The front end of the selection member 37 is branched through a groove 44, and a lower branching piece extends forward (Z1-direction). The extreme end of the branching piece acts as a selection regulator 43a. The upper side of the groove 44 formed above the selection regulator 43a acts as a first sliding portion 43b. Further, the lower side of the selection member 37 under the selection regulator 43a acts as a second sliding portion 43c.

Next, the orientation control operation of the face 10 and the advancing/retracting operation of the manipulation member 11b executed by the retracting mechanism 40 will be described.

In the ordinary orientation shown in FIG. 1, the face 10 is located on the front surface of the case 1 in a vertical orientation, and the control surface 10a on the front surface of the face 10 is also disposed vertically. In the ordinary orientation, the rotor 24 stops at a position to which it is circularly moved clockwise by the motor 29 in the reciprocating drive means 21, and the reciprocating member 23 is drawn backward (Z2-direction) and stops as shown in FIG.

5. Further, as shown in FIGS. 8A and 10A, the control pin 32, which is disposed at the base end of the orientation switching arm 31 circularly movably coupled with the side surface 10d of the face 10, is located at the extreme end of the upwardly inclined guide portion 33b, which is located forward, of the guide portion 33 formed in the bent piece 23b of the reciprocating member 23.

Further, as shown in FIG. 8A, the control pin 32 is located at the Z2-side end of the upper ordinary orientation path 35a of the diverging path 35 formed through the control sheet portion 34a. Further, the control pin 32 enters the groove 44 of the selection member 37. With this arrangement, the selection member 37 is circularly moved clockwise (F2-direction), the small projection 39 disposed at the rear end of the selection member 37 is engaged with the lock portion 42 formed through the control sheet portion 34a, and the selection member 37 is lightly locked in the orientation in which it is circularly moved clockwise (F2-direction).

As to the operation of the retracting mechanism 40 disposed in the face 10, first, when the face 10 is in the ordinary orientation shown in FIG. 10A, the transmission shaft 18a is pressed against the lower end surface 10b of the face 10 by the curved slot 31b of the orientation switching arm 31, and the transmission member 18 shown in FIG. 4 is circularly moved counterclockwise ($\alpha$1 direction) because the angle $\theta$ between the back surface of the face 10 and the orientation switching arm 31 is large. Accordingly, the cam member 15 engaged with the transmission shaft 18a is circularly moved in the $\alpha$1 direction, and the guide projections 16a of the advancing/retracting member 16 are moved in the Z-direction by the spiral loci of the cam grooves 15a formed in the cam member 15.

With this operation, the guide projections 16a move the guide grooves 10h of the guide portion 10g in the Z1-direction.

At this time, since the manipulation shaft 17a and the manipulation member 11b are projected in the Z1-direction by the urging force of the compressed coil spring 17c, the manipulation member (rotary manipulation knob) 11b is moved in the Z1-direction, whereby the manipulation member 11b is projected from the control surface 10a of the face 10 to the maximum distance L1. At this time, the extreme end of the manipulation member 11b projects further forward of the front edge portion 10e of the lower end surface 10b of the face 10. Thus, it is easy to manipulate the rotary manipulation type part 17 by rotating the manipulation member 11b with fingers because the manipulation member 11b can be grasped with fingers.

Further, when the face 10 is in the ordinary orientation, the equalizer, a receiving frequency of the radio, an image received by the TV, or a map of the car navigation system, for example, is displayed on the display member 11a of the control surface 10a. Further, the tuner of the radio is tuned, a channel of the TV is selected, the car navigation system is manipulated, the disc changer is manipulated, or the volume and quality of sound are regulated by the manipulation member 11b and the other manipulation members 11c.

When the face 10 is moved from the ordinary orientation shown in FIGS. 8A and 10A to the accommodated orientation, an accommodation manipulation button disposed on the control surface 10a of the face 10, or the like is depressed. With this manipulation, the rotor 24 is driven counterclockwise by the motor 29 shown in FIG. 5. Further, when the face 10 is continuously moved from the ordinary orientation to the accommodated orientation, the rotor 24 is circularly moved to its furthermost position counterclockwise as shown in FIG. 7 from the state of FIG. 5 through the state of FIG. 6. At this time, the motor 29 stops.

In the processes of FIGS. 5, 6, and 7, the reciprocating member 23 is reciprocated by a motion conversion means 27 composed of the circularly moving arm 24b of the rotor 24, the slide pin 26 secured to the circularly moving arm 24b, and the slot 23e formed through the reciprocating member 23. FIG. 6 shows a state in which the reciprocating member 23 projects farthest forward (Z1-direction), and while the reciprocating member 23 executes the projecting operation shown from FIG. 5 to FIG. 6, the face 10 is circularly moved from FIG. 8A to the horizontal orientation of FIG. 9B. Further, when the rotor 24 circularly moves from FIG. 6 to the orientation of FIG. 7 and the reciprocating member 23 is drawn backward, the face 10 takes the accommodated orientation shown in FIG. 9B.

First, in an initial process in which the reciprocating member 23 projects in the Z1-direction from the ordinary orientation shown in FIGS. 5, 8A, and 10A, the reciprocating member 23 linearly advances in the Z1-direction, and the control pin 32 disposed on the orientation switching arm 31 is linearly advanced in the Z1-direction in the ordinary orientation path 35a of the control sheet portion 34a that constitutes the diverging unit 22. With this operation, the face 10 advances in the Z1-direction in parallel without inclining until it takes the orientation shown in FIG. 8B.

In FIG. 8B, the control pin 32 reaches the front end of the ordinary orientation path 35a and cannot further advance in the Z1-direction. Therefore, when the reciprocating member 23 further advances in the Z1-direction, the control pin 32 and the orientation switching arm 31 cannot further advance while the support pin 12 which supports the face 10 advances. As a result, the upper end of the face 10 circularly moves downward as the reciprocating member 23 advances.

FIG. 8C shows a state in which the face 10 is circularly moving. In this state, the control pin 32 moves out of the upwardly inclined guide portion 33b of the reciprocating member 23 and moves to the linear guide portion 33a. At this time, the control pin 32 moves to the switching path 35c of the diverging path 35 of the control sheet portion 34a.

As shown in FIG. 9A, when the reciprocating member 23 advances farthermost forward in the Z1-direction, the face 10 takes the horizontal orientation. At this time, however, since the control pin 32 moves downward along the downwardly inclined guide portion 33c, the control pin 32 is located at the front end of the accommodated orientation path 35b of the control sheet portion 34a.

When the reciprocating member 23 retracts in the Z2-direction from FIG. 9A, the control pin 32 moves backward (Z2-direction) along the accommodated orientation path 35b of the control sheet portion 34a. Accordingly, the face 10 passes through the opening 7 while maintaining the horizontal orientation and is accommodated in the accommodating region 4 in the case 1 and the cabinet 2.

In the processes from FIG. 9A to FIG. 9B, the control pin 32 retracts backward in the accommodated orientation path 35b of the diverging path 35 of the control sheet portion 34a. At this time, however, the control pin 32 is abutted against the second sliding portion 43c of the lower side of the selection member 37 and slides thereon. Thus, the selection member 37 is circularly moved counterclockwise (F1-direction), and the small projection 39 disposed on the rear end of the selection member 37 moves out of the lock portion 42 of the control sheet portion 34a and enters the arc guide portion 41. As a result, the selection member 37 is released from the lightly locked state and can circularly move within the moving range of the arc guide portion 41 using the support shaft 36 as its fulcrum and circularly moved by the torsion spring 38 counterclockwise (F1-direction) at all times.

The operation of the retracting mechanism 40 which is executed while the face 10 circularly moves from the ordinary orientation to the horizontal orientation will be described.

As shown from FIG. 10A to FIG. 10C, while the face 10 circularly moves from the vertical orientation to the horizontal orientation, the angle θ between the back surface of the face 10 and the orientation switching arm 31 is gradually reduced and becomes zero when the face 10 reaches the horizontal orientation of FIG. 10C. When the relative position between the face 10 and the orientation switching arm 31 changes as described above, the transmission shaft 18*a* is pushed in the direction of the upper end surface 10*c* of the face 10 by the curved slot 31*b* formed through the orientation switching arm 31.

Therefore, the transmission member 18 shown in FIG. 4 is circularly moved clockwise, and the cam member 15 is circularly moved by the transmission shaft 18*a* in the α2-direction. At this time, the guide projections 16*a* are pushed in the Z2-direction by the cam grooves 15*a* of the cam member 15, and the advancing/retracting member 16 is moved in the guide portion 10*g* in the Z2-direction. The manipulation member 11*b* and the manipulation shaft 17*a* held by the advancing/retracting member 16 are retracted in the Z2-direction against the elastic force of the compressed coil spring 17*c*. Then, when the face 10 takes the horizontal orientation as shown in FIG. 10C, the amount of projection of the manipulation member 11*b* from the control surface 10*a* is reduced to L2.

In FIG. 10C, the extreme end surface of the manipulation member 11*b* is located at the same projecting position as the front edge portion 10*e* of the lower end surface 10*b* of the face 10, or retracts more toward the control surface 10*a* than the front edge portion 10*e*. Alternatively, the extreme end of the manipulation member 11*b* may retract to the same position as the control surface 10*a*. In the state of FIG. 10C, the face 10 in the horizontal orientation is accommodated in the cabinet 2 through the opening 7. At this time, the manipulation member 11*b* does not come into contact with the linear upper edge 7*a* of the opening 7.

When the face 10 is completely accommodated in the cabinet 2 as shown in FIG. 9B, the opening 7 of the front panel 3 is reliably closed by the lower end surface 10*b* of the face having the width W.

Note that in the processes from FIG. 8A to FIG. 9A, when the motor is stopped by detecting that the rotor 24 is at a predetermined circularly moving position or that the reciprocating member 23 is at a predetermined moving position, the face 10 can be stopped at the inclined orientation shown in FIGS. 8C and 10B and further at an inclined orientation having a different angle. When the face 10 is stopped in the inclined position as described above, the control surface 10*a* of the face 10 faces obliquely upward so that the display member 11*a* disposed on the control surface 10*a* can be viewed. Further, the manipulation member 11*b* can be circularly moved by providing a relatively large amount of projection L3 of the manipulation member 11*b* at that time.

Further, when the face 10 inclines to the angle shown in FIG. 8C, the inlet/outlet port 8 for a recording medium appears at a position adjacent to the upper end surface 10*c* of the face 10. Thus, a recording medium (disc) D can be inserted and discharged through the inlet/outlet port 8 from the upper portion of the face 10 in the above orientation and subsequent orientations.

To project the face from the accommodated orientation and to cause it to take the ordinary orientation, the processes from FIG. 7 to FIG. 5 which are opposite to the above processes will be executed.

When a switch is manipulated in the accommodated orientation of FIG. 7 and FIG. 9B, the motor 29 is started and the rotor 24 starts to circularly move clockwise. When the rotor 24 circularly moves to the orientation of FIG. 6, the reciprocating member 23 advances farthermost forward (Z1-direction). During the above operation, the control pin 32 advances in the accommodated orientation path 35*b* of the control sheet portion 34*a* in the Z1-direction. Further, since the control pin 32 is abutted against the second sliding portion 43*c* of the selection member 37 when it advances forward, the selection member 37 is circularly moved once clockwise. However, the circularly moving range of the selection member 37 is within the range in which the small projection 39 of the selection member 37 moves in the arc guide portion 41 in the control sheet portion 34*a*. Accordingly, when the control pin 32 moves to the front end of the accommodated orientation path 35*b* and gets out of the selection member 37, the selection member 37 is circularly moved counterclockwise (F1-direction) by the torsion spring 38, whereby the front end of the accommodated orientation path 35*b* is closed by the selection regulating portion 43*a* at the front end of the selection member 37.

When the rotor 24 further circularly moves clockwise from the state of FIG. 6, the reciprocating member 23 moves backward (Z2-direction). At this time, however, the control pin 32 is prevented from returning in the accommodated orientation path 35*b* by the selection regulating portion 43*a* of the selection member 37. Then, the control pin 32 is lifted by the downwardly inclined guide portion 33*c* formed in the reciprocating member 23 that moves backward, reaches the linear guide portion 33*a* and moves to the switching path 35*c* of the diverging path 35 disposed in the control sheet portion 34*a*. The reciprocating member 23 retracts in this state, and the linear guide portion 33*a* of the reciprocating member 23 slides the control pin 32.

When the reciprocating member 23 retracts as described above, the upper end surface 10*c* of the face 10 rises and circularly moves so as to be lifted, because the control pin 32 is held in the switching path 35*c* and the support pin 12 acting as the coupling point of the reciprocating member 23 and the face 10 moves backward. Then, when the face 10 takes the vertical orientation as shown in FIG. 8B, the control pin 32 is lifted by the upwardly inclined guide portion 33*b* disposed in the reciprocating member 23 and reaches the front end of the ordinary orientation path 35*a*.

When the reciprocating member 23 further retracts, the control pin 32 moves backward in the ordinary orientation path 35*a* of the control sheet portion 34*a*, and the face 10 takes the ordinary orientation for covering the face disengaging surface 6. During the period of time in which the face 10 reaches the ordinary orientation, the control pin 32 enters the groove 44 of the selection member 37. At this time, while the selection member 37 maintains the state in which it has been circularly moved counterclockwise by the urging force of the torsion spring 38 (the same state as that shown in FIG. 9B). However, the selection member 37 is circularly moved clockwise because the control pin 32 slides along the first sliding portion 43*b* in the groove 44. Thus, the small projection 39 moves out of the arc guide portion 41 and is engaged with the lock portion 42, and the selection member 37 is put into the lightly locked state as shown in FIG. 8A.

During a period of time in which the face 10 circularly moves from the horizontal orientation in FIG. 9A to an inclined orientation having a predetermined angle, the transmission shaft 18a is circularly moved counterclockwise by the curved slot 31b of the orientation switching arms 31 in the retracting mechanism 40, the cam member 15 is circularly moved in the α1 direction, and the manipulation member 11b is caused to project outwardly from the control surface 10a.

Further, in the present invention, the face 10 may move between the inclined orientation shown in FIG. 8C or FIG. 10B and the accommodated orientation shown in FIG. 9B without taking the vertical orientation as shown in 8A.

Further, in the embodiment shown in FIG. 4, the manipulation shaft 17a is disposed with respect to the rotary manipulation type part 17 so as to be free to advance and retract, and the manipulation shaft 17a is secured to the manipulation member 11b. When the manipulation shaft 17a advances and retracts, the manipulation member 11b executes an advancing/retracting motion relative to the rotary manipulation type part 17 while maintaining the coupling of the manipulation shaft 17a with the manipulation member 11b.

A part that is supported so as to be free to circularly move without the advancing and retracting movement of the manipulation shaft 17a may be used as the rotary manipulation type part 17. In this case, the manipulation shaft 17a is engaged with the manipulation member 11b through a spline, and the manipulation member 11b is coupled with the manipulation shaft 17a so that they can slide relative to another in an axial direction. The structure of this variation is such that the manipulation member 11b is projected forward by a spring and the manipulation member 11b is held by the advancing/retracting member 16. With the above arrangement, when the face 10 circularly moves from the ordinary orientation to the horizontal orientation and the advancing/retracting member 16 retracts in the face 10 at this time, the manipulation member 11b that retracts together with the advancing/retracting member 16 slides the manipulation shaft 17a in the axial direction. As a result, the manipulation member 11b retracts in the face 10 while maintaining the state in which the manipulation member 11b is coupled with the manipulation shaft 17a.

Figure 11:
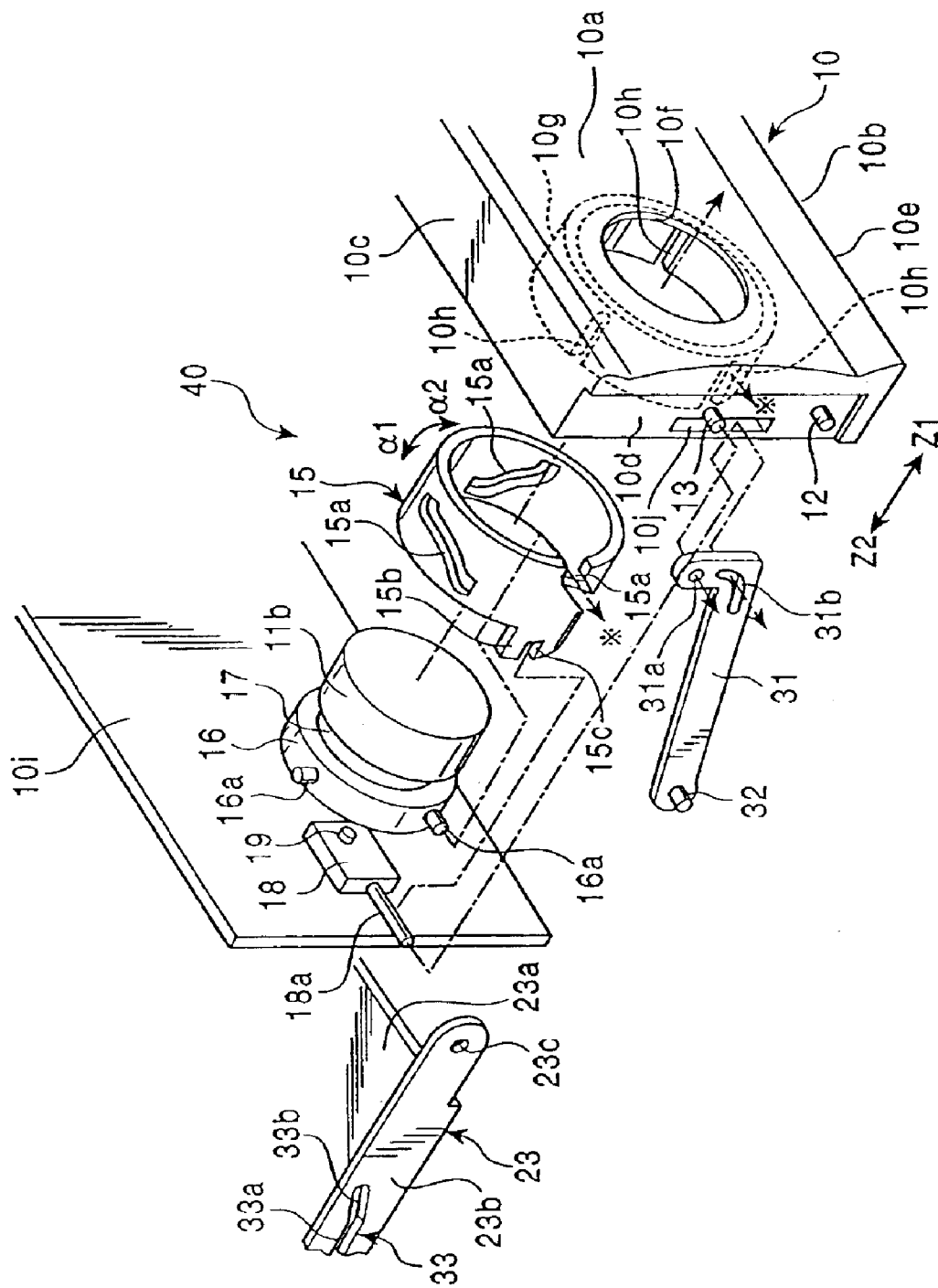
FIG. 11 is an exploded perspective view showing an advancing/retracting mechanism of a second embodiment of the present invention.

FIG. 11 shows a second embodiment of the present invention and is an exploded perspective view showing the same portions as those shown in FIG. 4. In the embodiment shown in FIG. 11, a rotary manipulation type part 17 is held in the advancing/retracting member 16 and the manipulation member (rotary manipulation knob) 11b is secured to the manipulation shaft of the rotary manipulation type part 17. Further, the rotary manipulation type part 17 may be rotated by the manipulation member 11b as well as pushed by the depressing force of the manipulation member 11b.

The manipulation member 11b projects forward from the round hole 10f of the control surface 10a in a state in which the cam member 15 is assembled to the guide portion 10g and the advancing/retracting member 16 is inserted into the cam member 15. Then, when the face 10 takes the horizontal orientation from the ordinary orientation and the cam member 15 is circularly moved by the transmission member 18, the advancing/retracting member 16 retracts together with the rotary manipulation type part 17. As a result, the extreme end of the manipulation member 11b operates so as to retract through the control surface 10a of the face 10.

Figure 12A:
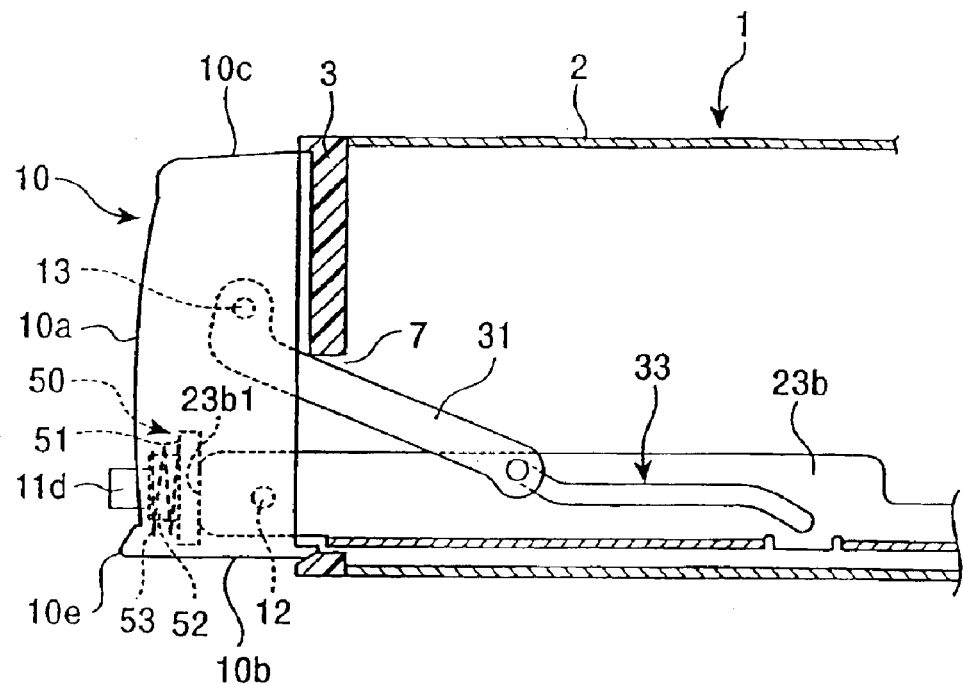
FIGS. 12A and 12B are side elevational views showing operations of the retracting mechanism of a third embodiment.
Figure 12B:
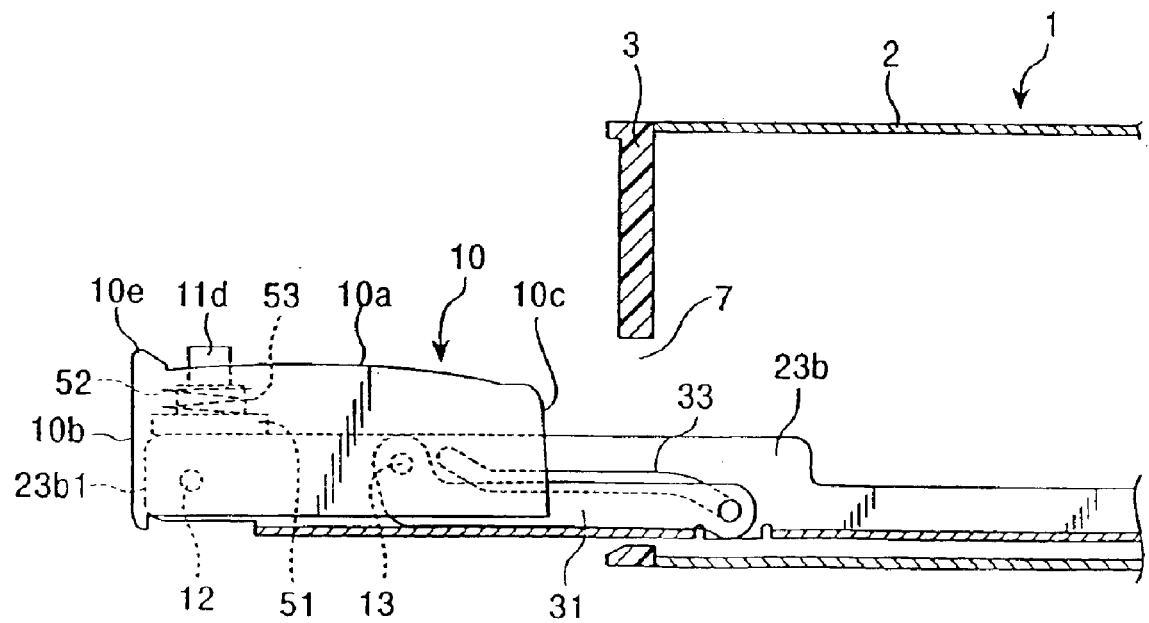

FIGS. 12A and 12B show a third embodiment of the present invention. In this embodiment, a manipulation member 11d is disposed in the vicinity of the front edge 10e and extends forward of the control surface 10a of the face 10. This manipulation member 11d is arranged as a push button. Further, a push type manipulation member (for example, a push switch) 52 that is manipulated by the manipulation member 11d is disposed in the face 10 and supported by a movable member 51. The movable member 51 is supported so as to advance and retract with respect to the face 10. Further, the movable member 51 is urged in a retracting direction by a compressed spring 53 at all times.

As shown in FIG. 12A, when the face 10 is in the ordinary vertical orientation, the movable member 51 is pushed forward by the extreme end 23b1 of the bent piece 23b of the reciprocating member 23 that constitutes the orientation variable means 20, whereby the manipulation member 11d greatly projects from the control surface 10a of the face 10.

Then, as shown in FIG. 12B, when the face 10 takes the horizontal orientation, the movable member 51 moves away from the extreme end 23b1 and is retracted in the face 10 by the compressed spring 53. As a result, the extreme end of the manipulation member 11d retracts more toward the control surface 10a than the front edge portion 10e of the face 10. Accordingly, when the face 10 in the horizontal orientation is accommodated in the case 1 through the opening 7, the manipulation member 11 does not come into contact with the edge of the opening 7. Further, in the ordinary orientation of the face of FIG. 12A, since the manipulation member 11d greatly projects from the control surface 10a, a large amount of stroke for pressing can be obtained. In this embodiment, a retracting mechanism is composed of the movable member 51 and the compressed spring 53.

As described above, according to the present invention, when the face is in the ordinary orientation, the manipulation member projects from the front surface of the face and operability is improved, whereas when the face is accommodated in the case, the amount of projection of the manipulation member is reduced. Thus, when the face moves into the case, the manipulation member does not come into contact with the edge of the opening. As a result, it is not necessary to provide a profiled cutout for the opening to permit the manipulation member to pass through the opening, which improves the hermetically sealed state of the case when the face is accommodated therein.

What is claimed is:

1. A vehicle-mounted electronic apparatus, comprising:
a case having an opening on the front surface thereof;
a face adapted to move from an ordinary orientation which is substantially vertical or oblique in front of said case to an accommodated orientation in which said face is accommodated within said case;
a manipulation member disposed on a manipulation surface of said face so as to face forward when said face is in the ordinary orientation, said manipulation member being supported by said face so as to be able to advance and retract so that the amount of projection thereof from the manipulation surface is changeable;
orientation variable means for moving said face from the ordinary orientation to the accommodated orientation and for drawing said face into said case through said opening; and
a retracting mechanism for automatically retracting said manipulation member when said face is move from the ordinary orientation to the accommodated orientation, so that the amount of projection of said manipulation member from the manipulation surface is reduced;
wherein when said face having the accommodated orientation enters said case through said opening, said manipulation member retracts to a position where said manipulation member does not come into contact with an edge of said opening.

2. A vehicle-mounted electronic apparatus according to claim 1, wherein a manipulation type part that is manipulated by said manipulation member is secured to said face, and when said manipulation member is advanced and retracted by said retracting mechanism, the relative position between the manipulation type part and said manipulation member is varied.

3. A vehicle-mounted electronic apparatus according to claim 2, wherein the manipulation type part is manipulated by being rotated and said retracting mechanism comprises a guide portion for guiding the manipulation member in an advancing/retracting direction while maintaining the coupling of said manipulation member with the manipulation type part, a rotary type cam member for advancing and retracting the manipulation member along the guide portion and a transmission member for circularly moving the cam member by the relative moving force between a member constituting said orientation variable means and said face when said face moves to the accommodated orientation.

4. A vehicle-mounted electronic apparatus according to claim 3, wherein:
   said orientation variable means comprises:
   a reciprocating member for executing an advancing/retracting motion while circularly movably supporting said face; and
   a switching arm for circularly movably supporting said face at a position different than said reciprocating member, said switching arm including a fulcrum on a base end side thereof;
   wherein when said reciprocating member moves forward of the fulcrum of said switching arm on the base end side thereof, said face changes orientation from the ordinary orientation to the accommodated orientation, and when said reciprocating member and said switching arm retract into said case, said face having the accommodated orientation is accommodated in said case; and
   said retracting mechanism retracts said manipulation member by the relative moving force between any of said reciprocating member and said switching arm and said face.

5. A vehicle-mounted electronic apparatus according to claim 2, wherein when said face having the accommodated orientation enters said case through said opening, said manipulation member retracts to a position where said manipulation member does not come into contact with the edge of said opening.

6. A vehicle-mounted electronic apparatus according to claim 5, wherein:
   said orientation variable means comprises:
   a reciprocating member for executing an advancing/retracting motion while circularly movably supporting said face; and
   a switching arm for circularly movably supporting said face at a position different than said reciprocating member, said switching arm including a fulcrum on a base end side thereof;
   wherein when said reciprocating member moves forward of the fulcrum of said switching arm on the base end side thereof, said face changes orientation from the ordinary orientation to the accommodated orientation, and when said reciprocating member and said switching arm retract into said case, said face having the accommodated orientation is accommodated in said case; and
   said retracting mechanism retracts said manipulation member by the relative moving force between any of said reciprocating member and said switching arm and said face.

7. A vehicle-mounted electronic apparatus according to claim 2, wherein:
   said orientation variable means comprises:
   a reciprocating member for executing an advancing/retracting motion while circularly movably supporting said face; and
   a switching arm for circularly movably supporting said face at a position different than said reciprocating member, said switching arm including a fulcrum on a base end side thereof;
   wherein when said reciprocating member moves forward of the fulcrum of said switching arm on the base end side thereof, said face changes orientation from the ordinary orientation to the accommodated orientation, and when said reciprocating member and said switching arm retract into said case, said face having the accommodated orientation is accommodated in said case; and
   said retracting mechanism retracts said manipulation member by the relative moving force between any of said reciprocating member and said switching arm and said face.

8. A vehicle-mounted electronic apparatus according to claim 1, wherein a manipulation type part that is manipulated by said manipulation member is accommodated in said face, and the manipulation type part and said manipulation member are advanced and retracted together by said retracting mechanism.

9. A vehicle-mounted electronic apparatus according to claim 8, wherein the manipulation type part is manipulated by being rotated, said advancing/retracting mechanism comprising a guide portion for guiding the manipulation type part in an advancing/retracting direction, a rotary type cam member for advancing and retracting the manipulation type part along the guide portion, and a transmission member for circularly moving the cam member by the relative moving force between a member constituting said orientation variable means and said face when said face circularly moves to the accommodated orientation.

10. A vehicle-mounted electronic apparatus according to claim 9, wherein when said face having the accommodated orientation enters said case through said opening, said manipulation member retracts to a position where it does not come into contact with the edge of said opening.

11. A vehicle-mounted electronic apparatus according to claim 9, wherein:
   said orientation variable means comprises:
   a reciprocating member for executing an advancing/retracting motion while circularly movably supporting said face; and
   a switching arm for circularly movably supporting said face at a position different than said reciprocating member,
   wherein when said reciprocating member moves forward of the fulcrum of said switching arm on the base end side thereof, said face changes its orientation from the ordinary orientation to the accommodated orientation, and when said reciprocating member and said switching arm retract into said case, said face having the accommodated orientation is accommodated in said case; and
   said retracting mechanism retracts said manipulation member by the relative moving force between any of said reciprocating member and said switching arm and said face.

12. A vehicle-mounted electronic apparatus according to claim 8, wherein when said face having the accommodated orientation enters said case through said opening, said manipulation member retracts to a position where it does not come into contact with the edge of said opening.

13. A vehicle-mounted electronic apparatus according to claim 12, wherein when said face is in the accommodated orientation, said opening is close by the end surface of said face, and said manipulation member has retracted to height where it does not project beyond the width direction of the end surface.

14. A vehicle-mounted electronic apparatus according to claim 12, wherein:

said orientation variable means comprises:

a reciprocating member for executing an advancing/retracting motion while circularly movably supporting said face; and a switching arm for circularly movably supporting said face at a position different than said reciprocating member, wherein when said reciprocating member moves forward of the fulcrum of said switching arm on the base end side thereof, said face changes its orientation from the ordinary orientation to the accommodated orientation, and when said reciprocating member and said switching arm retract into said case, said face having the accommodated orientation is accommodated in said case; and said retracting mechanism retracts said manipulation member by the relative moving force between any of said reciprocating member and said switching arm and said face.

15. A vehicle-mounted electronic apparatus according to claim 8, wherein:

said orientation variable means comprises:

a reciprocating member for executing an advancing/retracting motion while circularly movably supporting said face; and a switching arm for circularly movably supporting said face at a position different than said reciprocating member, wherein when said reciprocating member moves forward of the fulcrum of said switching arm on the base end side thereof, said face changes its orientation from the ordinary orientation to the accommodated orientation, and when said reciprocating member and said switching arm retract into said case, said face having the accommodated orientation is accommodated in said case; and said retracting mechanism retracts said manipulation member by the relative moving force between any of said reciprocating member and said switching arm and said face.

16. A vehicle-mounted electronic apparatus according to claim 1, wherein when said face having the accommodated orientation enters said case through said opening, said manipulation member retracts to a position where said manipulation member does not come into contact with the edge of said opening.

17. A vehicle-mounted electronic apparatus according to claim 16, wherein when said face is in the accommodated orientation, said opening is closed by the end surface of said face, and said manipulation member has retracted to a height where said manipulation member does not project beyond the width direction of the end surface.

18. A vehicle-mounted electronic apparatus according to claim 16, wherein:

said orientation variable means comprises:

a reciprocating member for executing an advancing/retracting motion while circularly movably supporting said face; and a switching arm for circularly movably supporting said face at a position different than from said reciprocating member, said switching arm including a fulcrum on a base end side thereof;

wherein when said reciprocating member moves forward of the fulcrum of said switching arm on the base end side thereof, said face changes orientation from the ordinary orientation to the accommodated orientation, and when said reciprocating member and said switching arm retract into said case, said face having the accommodated orientation is accommodated in said case; and said retracting mechanism retracts said manipulation member by the relative moving force between any of said reciprocating member and said switching arm and said face.

19. A vehicle-mounted electronic apparatus according to claim 1, wherein:

said orientation variable means comprises:

a reciprocating member for executing an advancing/retracting motion while circularly movably supporting said face; and a switching arm for circularly movably supporting said face at a position different than said reciprocating member, said switching arm including a fulcrum on a base end side thereof;

wherein when said reciprocating member moves forward of the fulcrum of said switching arm on the base end side thereof, said face changes orientation from the ordinary orientation to the accommodated orientation, and when said reciprocating member and said switching arm retract into said case, said face having the accommodated orientation is accommodated in said case; and said retracting mechanism retracts said manipulation member by the relative moving force between any of said reciprocating member and said switching arm and said face.

20. A method of operating a vehicle-mounted electronic apparatus comprising a case having an opening on the front surface thereof, a face movable from an ordinary orientation in front of said case to an accommodated orientation in which said face can be accommodated within said case, and a retractable manipulation member disposed on a manipulation surface of said face, the method comprising;

moving said face from the ordinary orientation to the accommodated orientation;

automatically retracting said manipulation member; and drawing said face into said case through said opening;

wherein said manipulation member is retracted substantially at the same time as said face is moved from the ordinary orientation to the accommodated orientation.

21. A method according to claim 20, wherein the ordinary orientation is substantially vertical or oblique.

22. A method according to claim 20, wherein the accommodated orientation is substantially horizontal.

23. A method according to claim 20, wherein said opening is substantially rectangular and said manipulation member is retracted to a position where said manipulation member does not come into contact with an edge of said opening when said face is drawn into said case through said opening.

24. A method of operating a vehicle-mounted electronic apparatus comprising a case having an opening on the front surface thereof, a face movable from a substantially vertical orientation in front of said case to a substantially horizontal orientation in which said face can be accommodated within said case through said opening, and a retractable manipulation member disposed on a manipulation surface of said face, the method comprising:

rotating said face from the substantially vertical orientation to the substantially horizontal orientation;

automatically retracting said manipulation member when said face is rotated from the substantially vertical orientation to the substantially horizontal orientation; and drawing said face into said case through said opening;

wherein said manipulation member is retracted to a position where said manipulation member does not come into contract with an edge of said opening when said face is drawn into said case.

* * * * *